US012213502B2

(12) United States Patent
Peterson et al.

(10) Patent No.: US 12,213,502 B2
(45) Date of Patent: *Feb. 4, 2025

(54) METHOD OF ENHANCING FLAVOR QUALITIES OF COFFEE USING NOVEL SMALL MOLECULES

(71) Applicant: OHIO STATE INNOVATION FOUNDATION, Columbus, OH (US)

(72) Inventors: Devin Peterson, Columbus, OH (US); Sichaya Sittipod, Columbus, OH (US); Eric Schwartz, Columbus, OH (US); Laurianne Paravisini, Columbus, OH (US)

(73) Assignee: Ohio State Innovation Foundation, Columbus, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 18/512,661

(22) Filed: Nov. 17, 2023

(65) Prior Publication Data
US 2024/0090549 A1 Mar. 21, 2024

Related U.S. Application Data

(63) Continuation of application No. 17/277,465, filed as application No. PCT/US2019/051780 on Sep. 18, 2019, now Pat. No. 11,856,975.
(Continued)

(51) Int. Cl.
*A23L 27/00* (2016.01)
*A23F 5/02* (2006.01)
(Continued)

(52) U.S. Cl.
CPC ............ *A23L 27/88* (2016.08); *A23F 5/02* (2013.01); *A23F 5/50* (2013.01); *A23L 27/28* (2016.08)

(58) Field of Classification Search
CPC .................. A23L 27/28; A23L 27/88
See application file for complete search history.

(56) References Cited

U.S. PATENT DOCUMENTS

| 3,540,889 A | 11/1970 | Clinton et al. |
| 3,924,017 A | 12/1975 | Lee et al. |

(Continued)

FOREIGN PATENT DOCUMENTS

| JP | 2013096895 | 5/2013 |
| JP | 2014204740 | 10/2014 |

(Continued)

OTHER PUBLICATIONS

Andujar-Ortiz, I., et al. (2015). Flavoromics for determining markers of cooked and fermented flavor in strawberry juices. In ACS Symposium Series (vol. 1191, pp. 293-312).
(Continued)

*Primary Examiner* — Anthony J Weier
(74) *Attorney, Agent, or Firm* — Meunier Carlin & Curfman LLC

(57) ABSTRACT

Shown herein are small molecule compounds that can be used to increase the overall quality of a coffee beverage. The flavor enhancing compounds can be combined with coffee at any stage of its processing to increase the cup score of a coffee beverage. In some embodiments, the flavor enhancing compounds include one or more caffeic ester compounds, for instance caffeic acid esterified with a cyclitol or related compound.

20 Claims, 25 Drawing Sheets

Related U.S. Application Data

(60) Provisional application No. 62/817,804, filed on Mar. 13, 2019, provisional application No. 62/802,862, filed on Feb. 8, 2019, provisional application No. 62/740,749, filed on Oct. 3, 2018, provisional application No. 62/732,856, filed on Sep. 18, 2018.

(51) Int. Cl.
  *A23F 5/50* (2006.01)
  *A23L 27/28* (2016.01)

(56) References Cited

U.S. PATENT DOCUMENTS

| | | | |
|---|---|---|---|
| 5,087,469 | A | 2/1992 | Acree |
| 5,232,735 | A | 8/1993 | Kurtz et al. |
| 5,336,513 | A | 8/1994 | Riemer |
| 8,197,875 | B2 | 6/2012 | Chien et al. |
| 11,856,975 | B2 * | 1/2024 | Peterson ................. A23L 27/28 |
| 2004/0213881 | A1 | 10/2004 | Chien et al. |
| 2006/0286238 | A1 | 12/2006 | Zehentbauer et al. |
| 2007/0042097 | A1 | 2/2007 | Norton et al. |
| 2007/0269570 | A1 | 11/2007 | Degenhardt et al. |
| 2014/0272068 | A1 | 9/2014 | Prakash et al. |
| 2016/0007625 | A1 | 1/2016 | Domon |
| 2016/0242431 | A1 | 8/2016 | Nakahara et al. |
| 2016/0366915 | A1 | 12/2016 | Singh et al. |
| 2017/0327776 | A1 | 11/2017 | Chien |
| 2022/0218008 | A1 | 7/2022 | Peterson |
| 2022/0395007 | A1 | 12/2022 | Peterson et al. |
| 2023/0000121 | A1 | 1/2023 | Peterson et al. |

FOREIGN PATENT DOCUMENTS

| | | |
|---|---|---|
| WO | 2002087360 | 11/2002 |
| WO | 2015158895 | 10/2015 |
| WO | 2019071220 A1 | 4/2019 |
| WO | 2019/121551 A1 | 6/2019 |
| WO | 2019180140 | 9/2019 |
| WO | 2020061223 | 3/2020 |
| WO | 2020210118 | 10/2020 |
| WO | 2021081417 | 4/2021 |

OTHER PUBLICATIONS

Bertrand, B., et al., (2012). Climatic factors directly impact the volatile organic compound fingerprint in green Arabica coffee bean as well as coffee beverage quality. Food Chemistry, 135(4), 2575-2583.

Blank, I., et al., (1991). Aroma impact compounds of arabica and robusta coffee. Qualitative and quantitative investigations. ASIC. 14e Colloque, 117-129.

Blank, I., et al., (1992). Potent odorants of the roasted powder and brew of Arabica coffee. Zeitschrift Für Lebensmittel-Untersuchung Und Forschung, 195(3), 239-245.

Blumberg et al: "Quantitative Studies on the Influence of the Bean Roasting Parameters and Hot Water Percolation on the Concentrations of Bitter Compounds in Coffee Brew", Journal of Agricultural and Food Chemistry, vol. 58, No. 6, Feb. 24, 2010 (Feb. 24, 2010), pp. 3720-3728, XP055064049, ISSN: 0021-8561, DOI: 10.1021/jf9044606.

Bucheli, P., et al., (1998). Industrial storage of green Robusta coffee under tropical conditions and its impact on raw material quality and ochratoxin A content. Journal of Agricultural and Food Chemistry, 46(11), 4507-4511.

Buffo, R. A., & Cardelli-Freire, C. (2004). Coffee flavour: an overview. Flavour and Fragrance Journal, 19(2), 99-104.

Charles, M., et al., (2015). Understanding flavour perception of espresso coffee by the combination of a dynamic sensory method and in-vivo nosespace analysis. Food Research International, 69, 9-20.

Charles-Bernard, M. et al., Interactions between volatile and nonvolatile coffee components. 1. Screening of nonvolatile components, 2005; 53(11):4417-25.

Charve, J., et al., (2011). Evaluation of instrumental methods for the untargeted analysis of chemical stimuli of orange juice flavour. Flavour and Fragrance Journal, 26(6), 429-440.

Chung, H. Y., et al., (2005). Aroma impact components in commercial plain sufu. Journal of Agricultural and Food Chemistry, 53(5), 1684-1691.

Clifford, M. N. (1985). Chemical and Physical Aspects of Green Coffee and Coffee Products. In Coffee (pp. 305-374). Boston, MA: Springer US.

Clifford, M. N., et al., (2003). Hierarchical scheme for LC-MS$^n$ identification of chlorogenic acids. Journal of Agricultural and Food Chemistry, 51(10), 2900-2911.

Craig, A. P., et al., (2018). Mid infrared spectroscopy and chemometrics as tools for the classification of roasted coffees by cup quality. Food Chemistry, 245, 1052-1061.

Dalton, P., et al., (2000). The merging of the senses: integration of subthreshold taste and smell. Nature Neuroscience, 3(5), 431-432.

Dorfner, R., et al., (2003). Real-time monitoring of 4-vinylguaiacol, guaiacol, and phenol during coffee roasting by resonant laser ionization time-of-flight mass spectrometry. Journal of Agricultural and Food Chemistry, 51(19), 5768-5773.

Farah, A., et al., (2005). Effect of roasting on the formation of chlorogenic acid lactones in coffee. Journal of Agricultural and Food Chemistry, 53(5), 1505-1513.

Feng, Y., et al., (2013). Effect of koji fermentation on generation of volatile compounds in soy sauce production. International Journal of Food Science and Technology, 48(3), 609-619.

Feria-Morales, A. M. (2002). Examining the case of green coffee to illustrate the limitations of grading systems/expert tasters in sensory evaluation for quality control. Food Quality and Preference, 13(6), 355-367.

Frank, O., et al., (2006). Bioresponse-guided decomposition of roast coffee beverage and identification of key bitter taste compounds. Eur Food Res Technol, 222, 492-508.

Frank, O., et al., (2007). Structure determination and sensory analysis of bitter-tasting 4-vinylcatechol oligomers and their identification in roasted coffee by means of LC-MS/MS. Journal of agricultural and food chemistry, 55(5), 1945-1954.

Geel, L., et al., (2005). Relating consumer preferences to sensory attributes of instant coffee. Food Quality and Preference, 16(3), 237-244.

Giacalone, D., et al., (2016). "Quality does not sell itself." British Food Journal, 118(10), 2462-2474.

Ginz, M., & Engelhardt, U. H. (2000). Identification of proline-based diketopiperazines in roasted coffee. Journal of agricultural and food chemistry, 48(8), 3528-3532.

Glowacki et al. Determination of Total Apigenin in Herbs by Micellar Electrokinetic Chromatography with UV Detection. Journal of Analytical Methods in Chemistry. vol. 2016. Article ID 3827832. (2016). 8 pages.

Harwood, M. L., et al., (2012). Rejection thresholds in chocolate milk: Evidence for segmentation. Food Quality and Preference, 26(1), 128-133.

Holscher, W., et al., (1990). Identification and sensorial evaluation of aroma-impact-compounds in roasted colombian coffee. Caf, Cacao Th,, 34(3), 205-212.

Iwasa, K., et al., (2015). Identification of 3-Methylbutanoyl Glycosides in Green Coffea arabica Beans as Causative Determinants for the Quality of Coffee Flavors. Journal of Agricultural and Food Chemistry, 63(14), 3742-3751.

Kreppenhofer, S., et al., (2011). Identification of (furan-2-yl) methylated benzene diols and triols as a novel class of bitter compounds in roasted coffee. Food chemistry, 126(2), 441-449.

Kumazawa, K., & Masuda, H. (2003). Investigation of the change in the flavor of a coffee drink during heat processing. Journal of Agricultural and Food Chemistry, 51(9), 2674-2678.

Kwon, D.-J., et al., (2015). Assessment of green coffee bean metabolites dependent on coffee quality using a 1H NMR-based metabolomics approach. Food Research International, 67, 175-182.

(56) References Cited

OTHER PUBLICATIONS

Lang, R., et al., (2013). 2-O-β-d-Glucopyranosyl-carboxyatractyligenin from *Coffea* L. inhibits adenine nucleotide translocase in isolated mitochondria but is quantitatively degraded during coffee roasting. Phytochemistry, 93, 124-135.
Lang, R., et al., (2015). Mozambioside is an arabica-specific bitter-tasting furokaurane glucoside in coffee beans. Journal of agricultural and food chemistry, 63(48), 10492-10499.
Ley, J. P. (2008). Masking bitter taste by Molecules. Chemosensory Perception, 1(1), 58-77.
Ley, J. P., et al., (2006). New bitter-masking compounds: Hydroxylated benzoic acid amides of aromatic amines as structural analogues of homoeriodictyol. Journal of Agricultural and Food Chemistry, 54(22), 8574-8579.
Masi, C., et al., (2015). The impact of individual variations in taste sensitivity on coffee perceptions and preferences. Physiology & behavior, 138, 219-226.
Maehashi, K. and Huang, L., Bitter peptides and bitter taste receptors, Cell. Mol. Life Sci. 66, 1661, 2009.
Pereira, L. L., et al., (2017). The consistency in the sensory analysis of coffees using Q-graders. European Food Research and Technology, 243(9), 1545-1554.
Piccino, S., et al., (2014). Aromatic composition and potent odorants of the "specialty coffee" brew "Bourbon Pointu" correlated to its three trade classifications. Food Research International, 61, 264-271.
Ribeiro, J. S., et al., (2011). Chemometric models for the quantitative descriptive sensory analysis of Arabica coffee beverages using near infrared spectroscopy. Talanta, 83(5).
Ronningen, I., et al., (2018). Identification and Validation of Sensory-Active Compounds from Data-Driven Research: A Flavoromics Approach. Journal of Agricultural and Food Chemistry, 66(10), 2473-2479.
Ronningen, I., & Peterson, D. G. (2018). Identification of Aging-Associated Food Quality Changes in Citrus Products Using Untargeted Chemical Profiling. Journal of Agricultural and Food Chemistry, 66(3), 682-688.
Samoggia, A., & Riedel, B. (Oct. 1, 2018). Coffee consumption and purchasing behavior review: Insights for further research. Appetite. Academic Press.
SCA. (2018). Protocols & Best Practices—Specialty Coffee Association. Retrieved from https://sca.coffee/research/protocols-best-practices/.
Schieberle, P., & Grosch, W. (1988). Quantitative analysis of important volatile flavour compounds in fresh and stored lemon oil/citric acid emulsions. Lebensm.-Wiss.u.-Technol., 21, 158-162.
Schrader, K., et al., (1996). Determination of chlorogenic acids with lactones in roasted coffee. J Sci Food Agric, 71(3), 392-398.
Sittipod, S. et al: "Identification of flavor modulating compounds that positively impact coffee quality", Food Chemistry, Elsevier Ltd, NL, vol. 301, Jul. 24, 2019 (Jul. 24, 2019), XP085781894, ISSN: 0308-8146, DOI: 10.1016/J.FOODCHEM.2019.125250.
Sittipod, S., et al., (2020). Identification of Compounds that Negatively Impact Coffee Quality Using Untargeted LC/MS Analysis. Journal of Agricultural and Food Chemistry.
Slavin, J., Dietary Guidelines, Are We on the Right Path?, Nutr. Today 47, 245 (2012).
Specialty Coffee Association. Accessed Apr. 7, 2019. From: https://sca.coffee/research/coffee-standards.
Sunarharum, W. B., et al., (2014). Complexity of coffee flavor: A compositional and sensory perspective. Food Research International, 62, 315-325.
Teegarden, M. D., et al., (2019). Profiling the impact of thermal processing on black raspberry phytochemicals using untargeted metabolomics. Food Chemistry, 274, 782-788.
Tepper, B., et al., (2009). Genetic variation in taste sensitivity to 6-n-propylthiouracil and its relationship to taste perception and food selection. Annals of the New York Academy of Sciences, 1170(1), 126-139.
Toci, A. T., & Farah, A. (2008). Volatile compounds as potential defective coffee beans' markers. Food Chemistry, 108(3), 1133-1141.
Tolessa, K., et al., (2016). Prediction of specialty coffee cup quality based on near infrared spectra of green coffee beans. Talanta, 150, 367-374.
Upadhyay, R., & Mohan Rao, L. J. (2013). An Outlook on Chlorogenic Acids—Occurrence, Chemistry, Technology, and Biological Activities. Critical Reviews in Food Science and Nutrition, 53(9), 968-984.
Baggenstos, J, et al., (2008) Coffee roasting and aroma formation: application of different time-temperature conditions. J Agric Food Chem 56:5836-5846.
Dias, R.C.E., et al., (2014) Roasting process affects the profile of diterpenes in coffee. Eur Food Res Technol 239:961-970.
Dias, R.C.E., et al., (2013) Comparison of Extraction Methods for Kahweol and Cafestol Analysis in Roasted Coffee. Artic J Braz Chem Soc 24:492-499.
Farah, Adriana, et al. "Correlation between cup quality and chemical attributes of Brazilian coffee." Food chemistry 98.2 (2006): 373-380.
Fujimura Y, et al., (2011) Metabolomics-Driven Nutraceutical Evaluation of Diverse Green Tea Cultivars. PLoS One 6:e23426.
Novaes FJM, et al., (2015) New approaches on the analyses of thermolabile coffee diterpenes by gas chromatography and its relationship with cup quality. Talanta 139:159-166.
Scheidig C, et al., (2007) Changes in Key Odorants of Raw Coffee Beans during Storage under Defined Conditions. J Agric Food Chem 55:5768-5775.
Speer, K. and Kölling-Speer, I. (2006) The lipid fraction of the coffee bean. Brazilian J Plant Physiol 18:201-216.
Extended European Search Report for EP Application No. 20810128.7 dated Jan. 5, 2023, 8 pages.
Extended European Search Report issued for Application No. 19863400.8, dated May 2, 2022. 8 pages.
International Search Report and Written Opinion for International Application No. PCT/US2019/057180 dated Jan. 27, 2021, 8 pages.
International Search Report and Written Opinion for International Application No. PCT/US2020/034016 dated Sep. 25, 2020, 8 pages.
International Search Report and Written Opinion for International Application No. PCT/US2020/057197 dated Mar. 8, 2021, 11 pages.
PUBCHEM CID 183905. 6,8-Di-C-beta-D-arabinopyranosyl apigenin. Created Sep. 8, 2005. 10 pages.
PUBCHEM CID 5280441. Vitexin. Created Sep. 16, 2004. 34 pages.
PUBCHEM CID 162350. Isovitexin. Created Sep. 16, 2004. 28 pages.
Extended European Search Report issued on Oct. 6, 2023, in European Application No. 20878059.3.
Kucera et al. "Study of composition of espresso coffee prepared from various roast degrees of *Coffee arabica*L. coffee beans", Food Chemistry, Elsevier Ltd, NL, vol. 199, Dec. 18, 2015 (Dec. 18, 2015), pp. 727-735, XP029386329, ISSN: 0308-8146, DOI: 10.1016/J.FOODCHEM.2015.12.080.
Lang et al. "Raw coffee based dietary supplements contain carboxyatractyligenin derivatives inhibiting mitochondrial adenine-nucleotide-translocase", Food and Chemical Toxicology, Pergamon, GB, vol. 70, May 24, 2014, pp. 198-204, XP028860404, ISSN: 0278-6915, DOI: 10.1016/J.FCT.2014.05.2017.
Hua et al. "Artractyligenin, a terpenoid isolated from coffee silverskin, inhibits cutaneous photoaging", Journal of Photochemistry and Photobiology B: Biology, vol. 194, Apr. 4, 2019, pp. 166-173, XP085667315, ISSN: 1011-1344, DOI: 10.1016/J.JPHOTOBIOL.2019.04.002.
International Search Report and Written Opinion issued by the International Searching Authority (ISA/US) in PCT Application No. PCT/US2019/051780 on Dec. 4, 2019. 8 pages.
Restriction Requirement mailed on Apr. 22, 2024, in U.S. Appl. No. 17/612,779.
Communication pursuant to Article 94(3) EPC mailed on May 24, 2024, in European Patent Application No. 20878059.3.
Non-Final Office Action issued on Jul. 16, 2024, in U.S. Appl. No. 17/612,779.

(56) References Cited

OTHER PUBLICATIONS

Dawidowicz et al. "The influence of pH on the thermal stability of 5-O-caffeoylquinic acids in aqueous solutions", 2011, Eur Food Res Technol, 233, pp. 223-232.
Bjarnadottir, A., "Is Coffee Acidic?", 2019, Healthline, https://www.healthline.com/nutrition/is-coffee-acidic.
Non-Final Office Action issued on Aug. 30, 2024 in U.S. Appl. No. 17/770,975.

\* cited by examiner

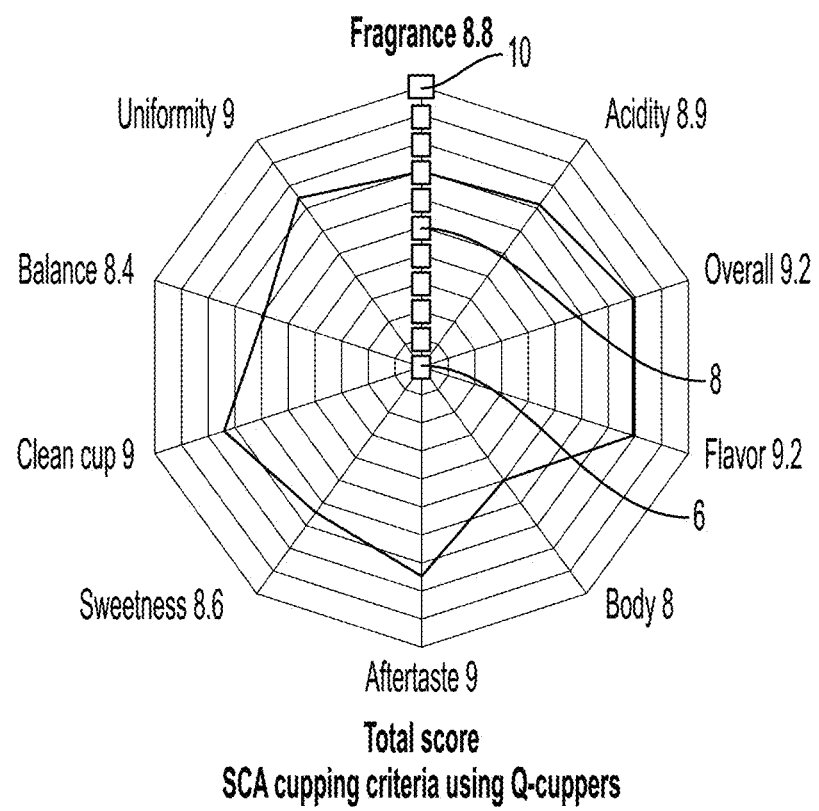
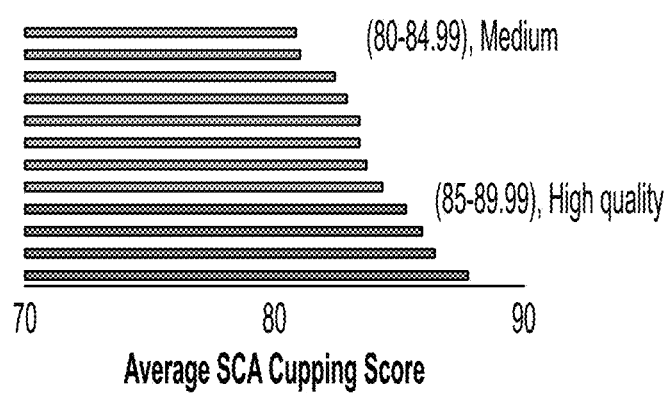
FIG. 1

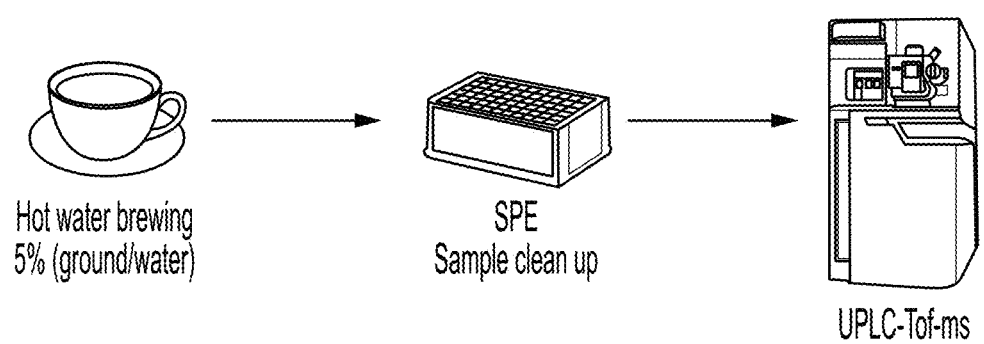
FIG. 1 (CON'T)

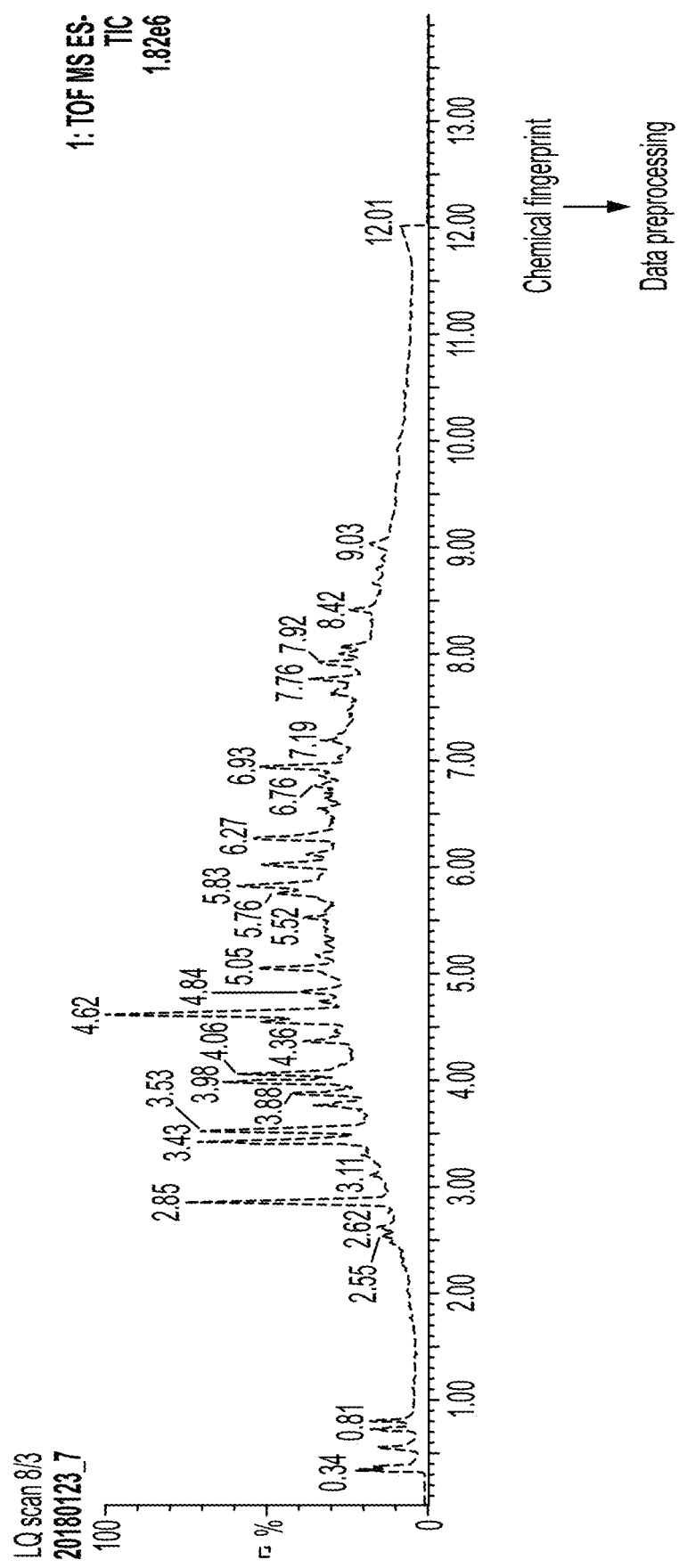
FIG. 1 (CON'T)

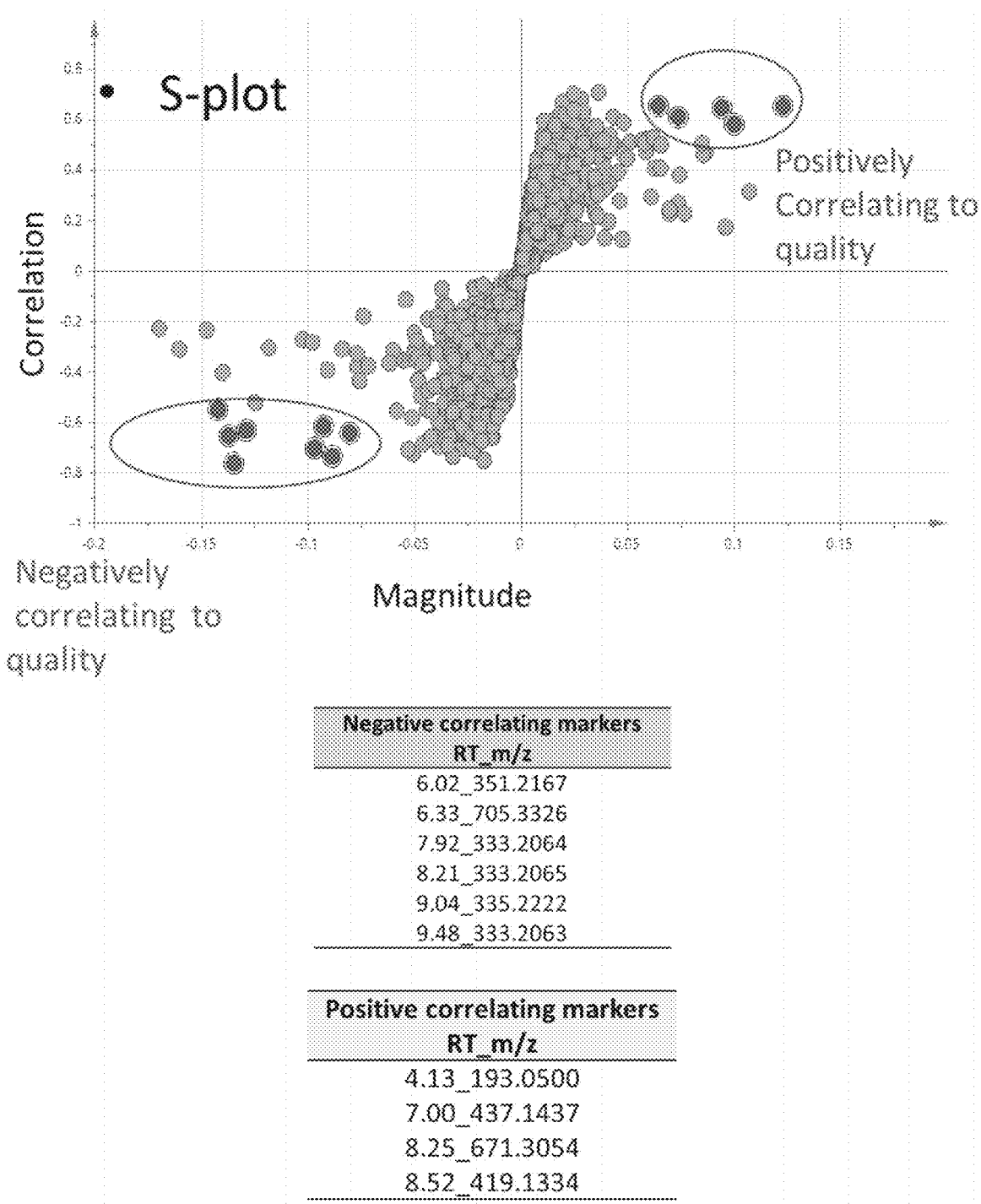
FIG. 2 (CON'T)

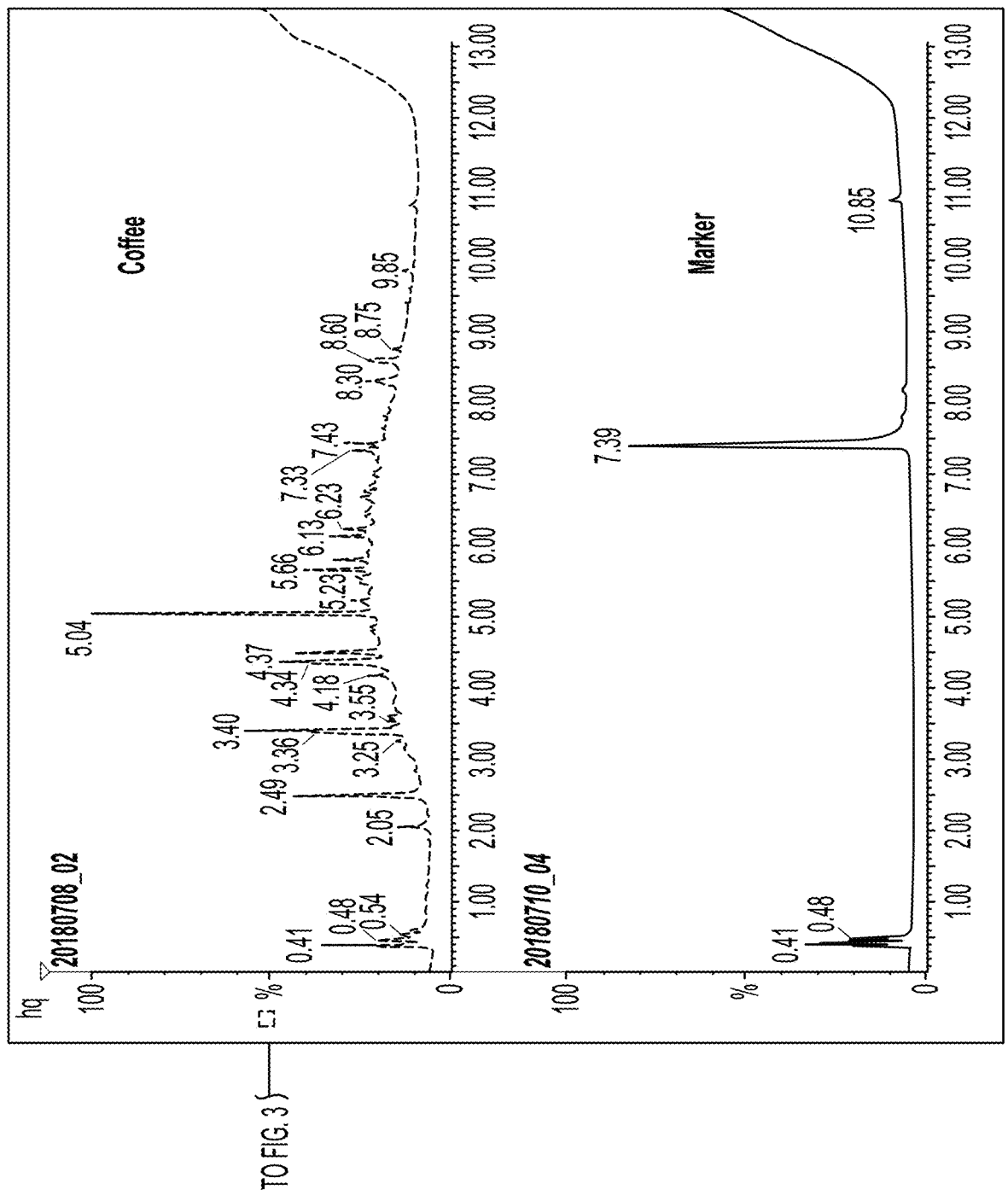
FIG. 3 (CON'T)

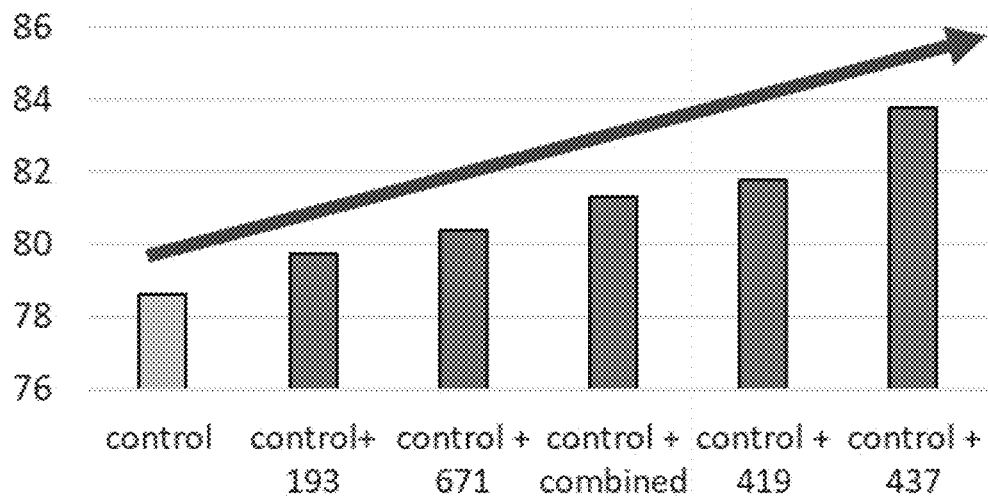
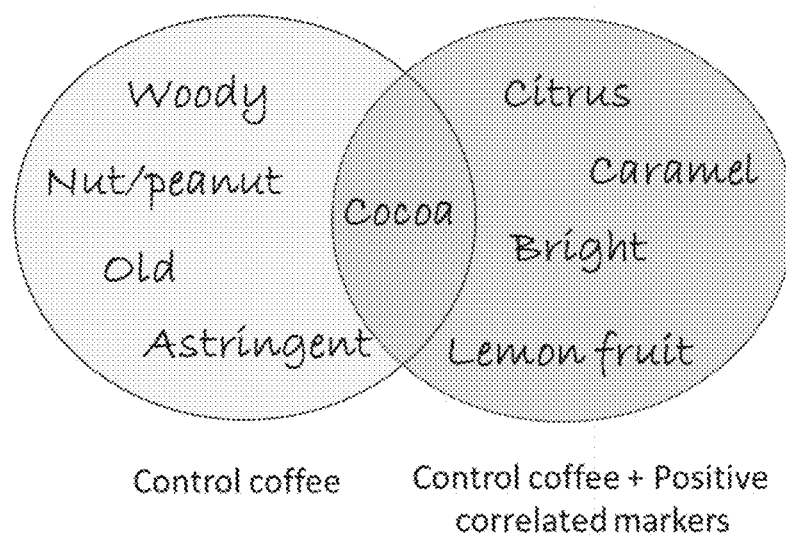
FIG. 7

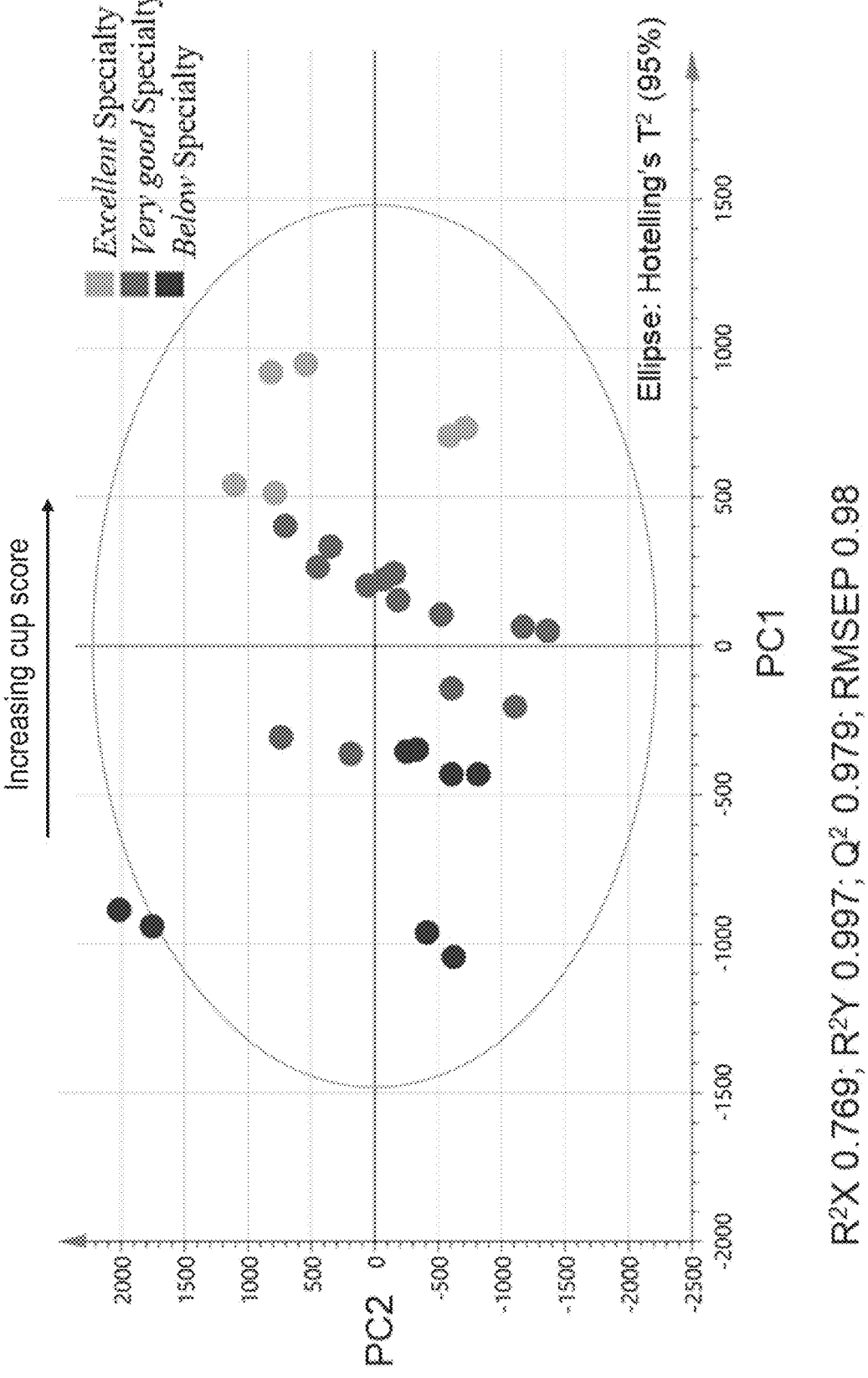

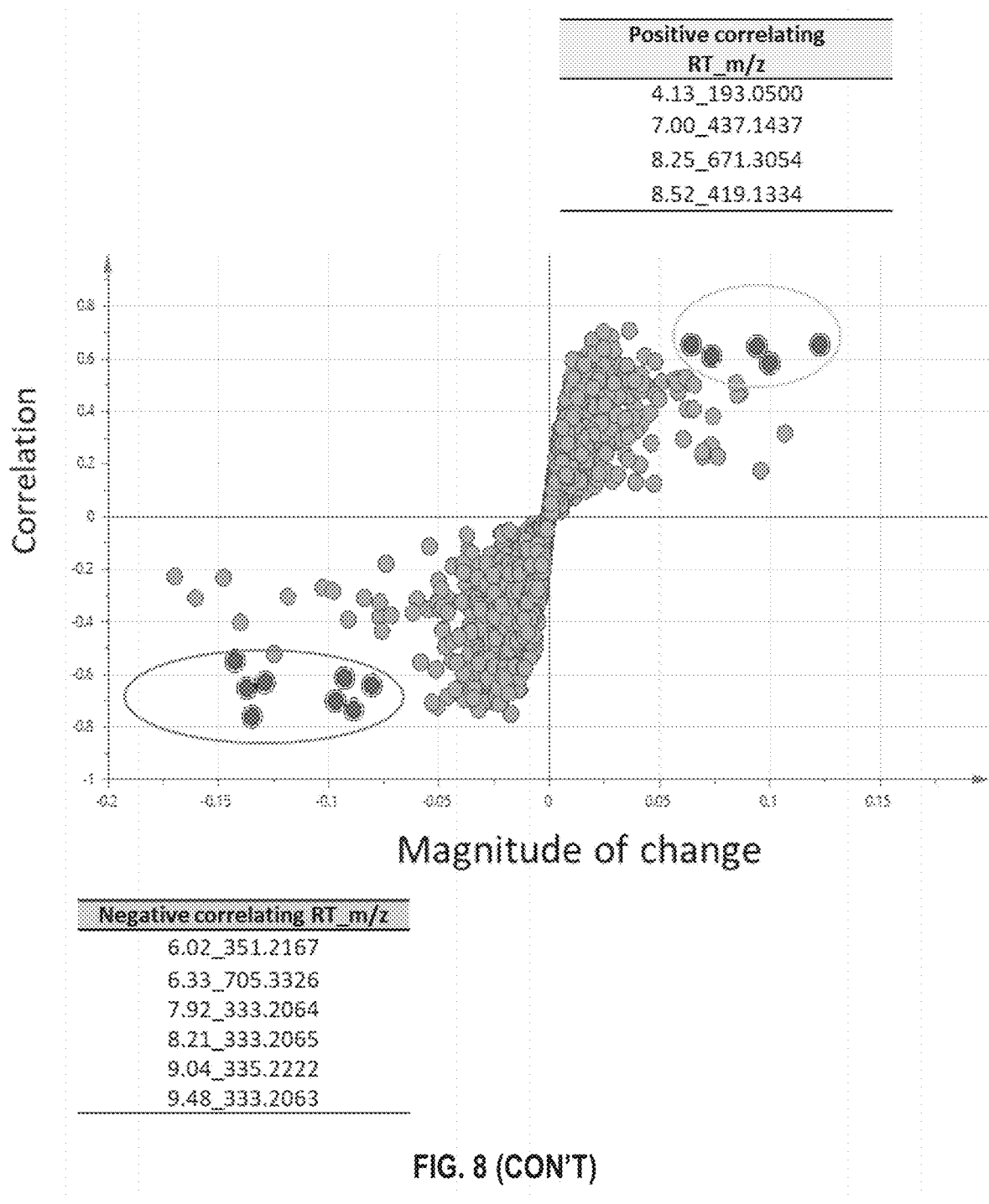
FIG. 8 (CON'T)

QUANTITATIVE PROFILES OF SELECTED MARKERS

LC/MS-Multiple reaction monitoring (MRM) parameters of markers of interest in coffee

| Correlation to cupping score | | [M-H] | Transition | Concentration (mg/L) | | |
|---|---|---|---|---|---|---|
| | | | | LQ coffee | MQ coffee | HQ coffee |
| Positive | | 193.05 | 193.0 → 121.0 | 0.73[c] | 1.12[b] | 1.38[a] |
| | | 437.1 | 437.1 → 173.1 | 1.38[b] | 1.99[b] | 3.21[a] |
| | | 419.1 | 419.1 → 179.0 | 3.69[b] | 5.89[b] | 7.97[a] |
| | | 671.3 | 671.3 → 221.1 | 2.08[c] | 5.53[b] | 11.68[a] |
| | | 333.2 | 317.2* → 253.2 | 5.26[a] | 4.37[b] | 0.12[c] |
| | | 333.2 | 317.2* → 253.2 | 3.08[a] | 2.55[b] | 0.00[c] |
| Negative | | 333.2 | 317.2* → 253.2 | 0.65[a] | 0.54[b] | 0.02[c] |
| | | 335.2 | 301.2* → 255.2 | 2.25[a] | 1.10[b] | 0.11[c] |
| | | 351.2 | 351.2 → 321.2 | 1.97[a] | 0.87[b] | 0.08[c] |
| | | 705.3 | 705.3 → 659.0 | 2.33[a] | 1.09[b] | 0.09[c] |

*monitored in ESI positive mode

FIG. 9

POSITIVE MARKER M/Z 437
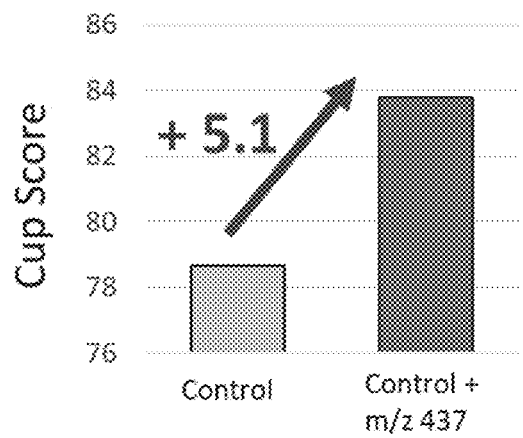
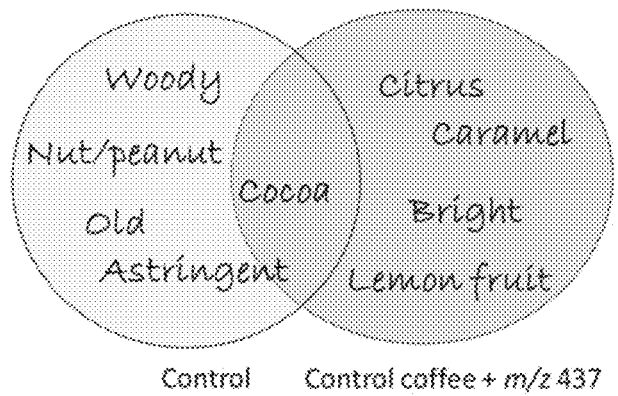
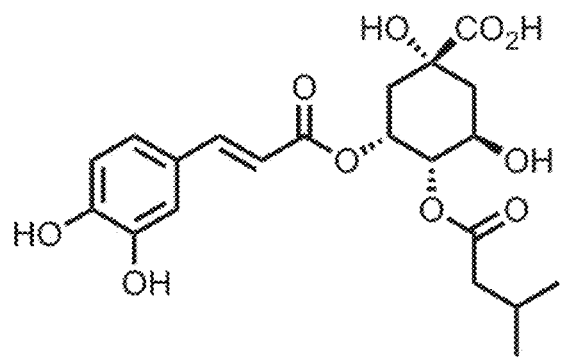
3-O-caffeoyl-4-O-3-methylbutanoylquinic acid
FIG. 10

POSITIVE MARKER 419 M/Z
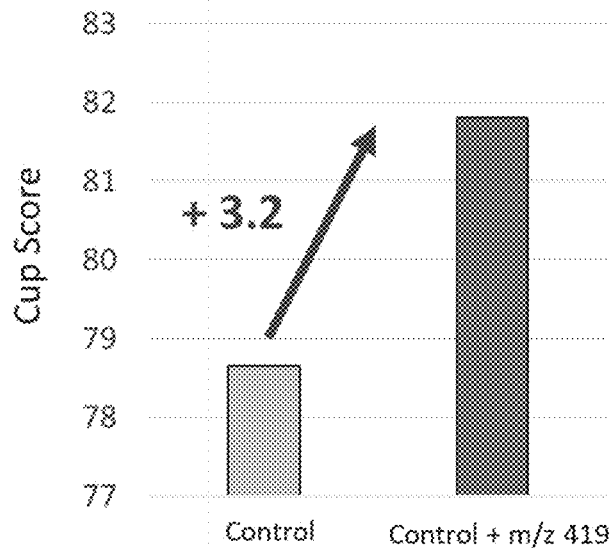
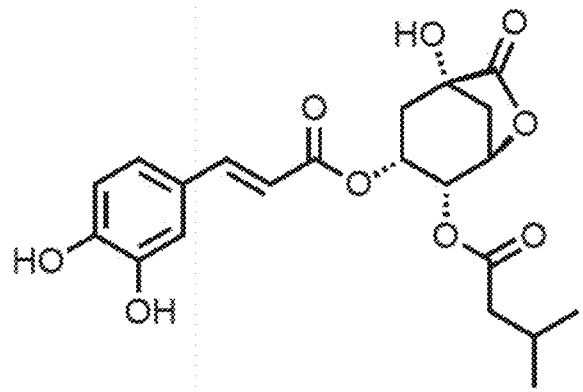
3-O-caffeoyl-4-O-3-methylbutanoyl-1,5-quinide
Buffer pH 5 + m/z 419 or Nanopure water + m/z 419
No flavor activity when tasted by itself
FIG. 11

SENSORY IMPACT OF NEGATIVE MARKERS
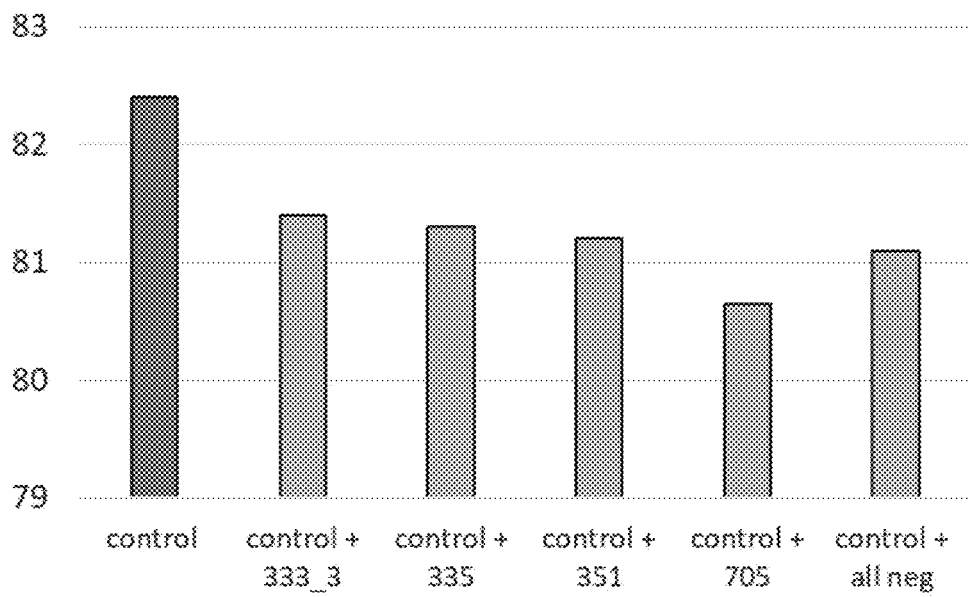
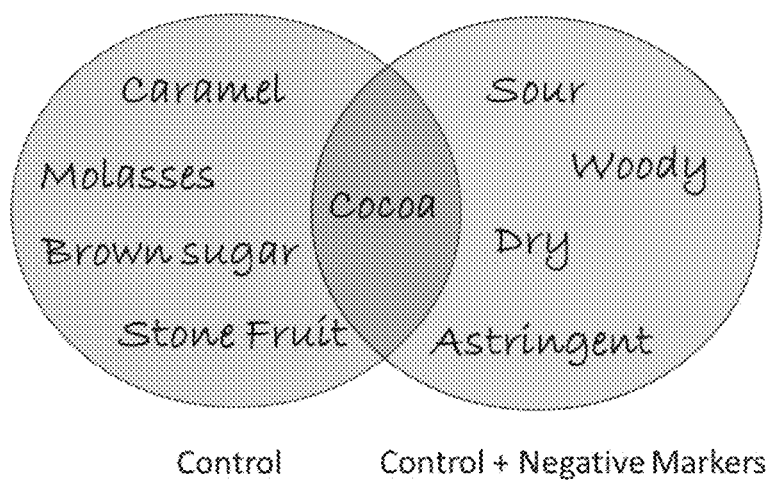
*No defect in all samples
FIG. 13

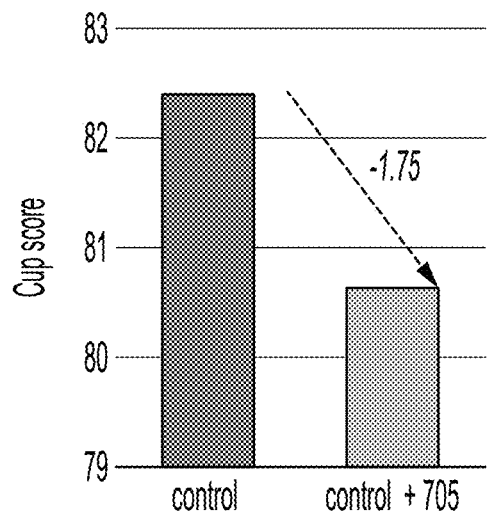
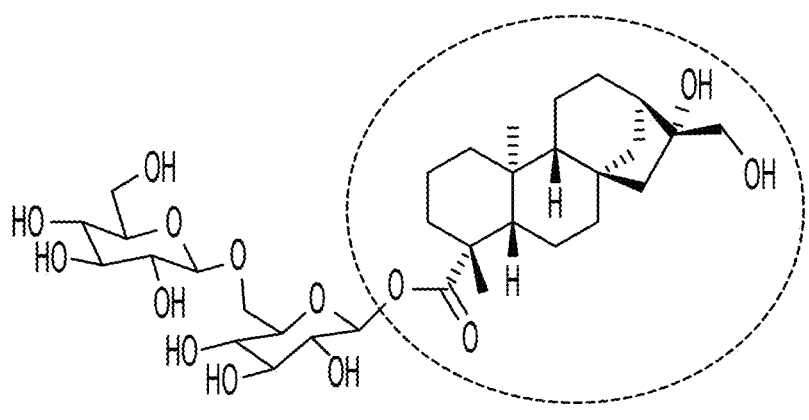
ent-16α,17-dihydroxy-kauran-19-diglucoside
Formic acid adduct (M - H + 46)⁻
Exact Mass: 705.3339
FIG. 14

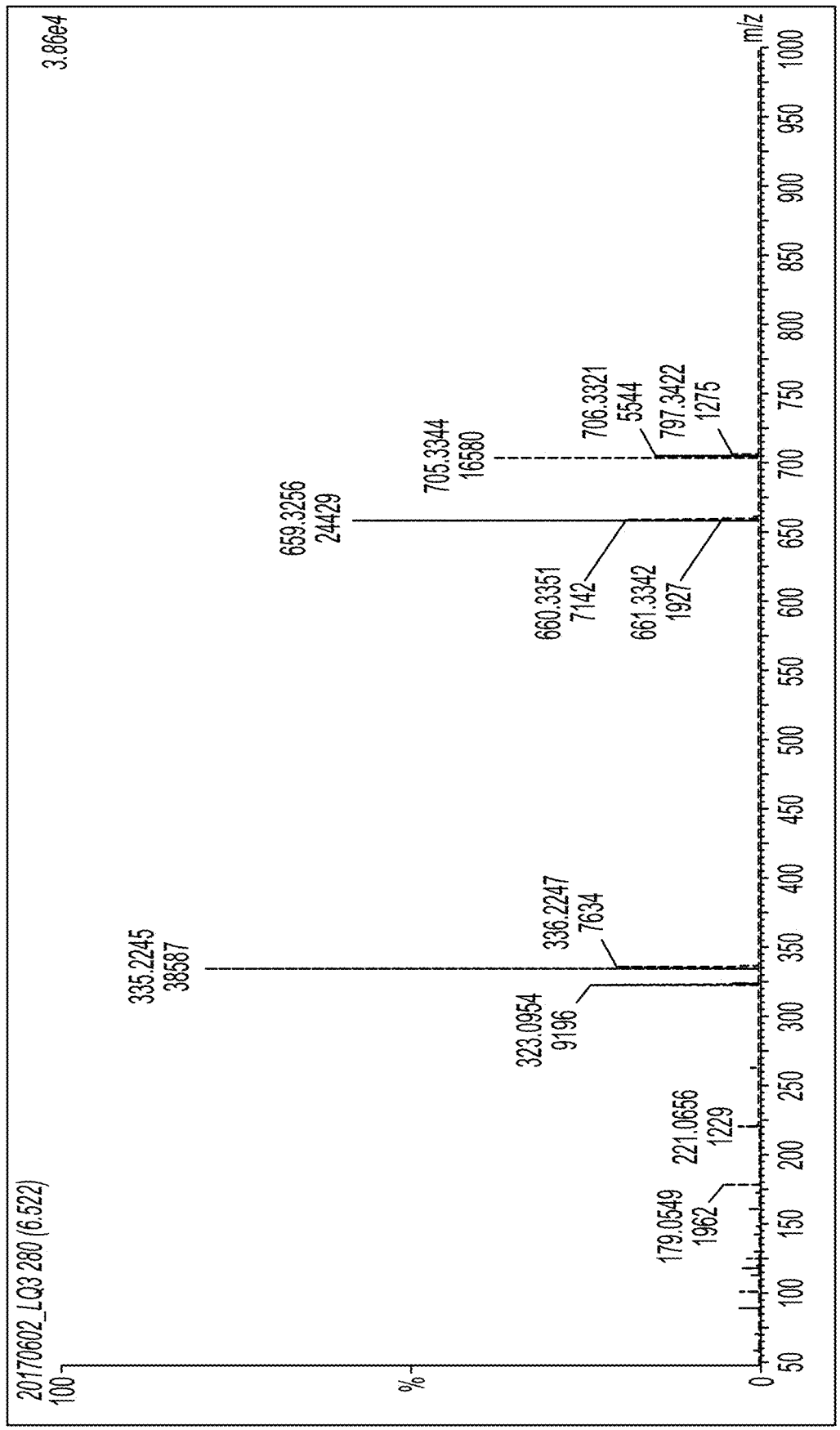
FIG. 14 (CON'T)

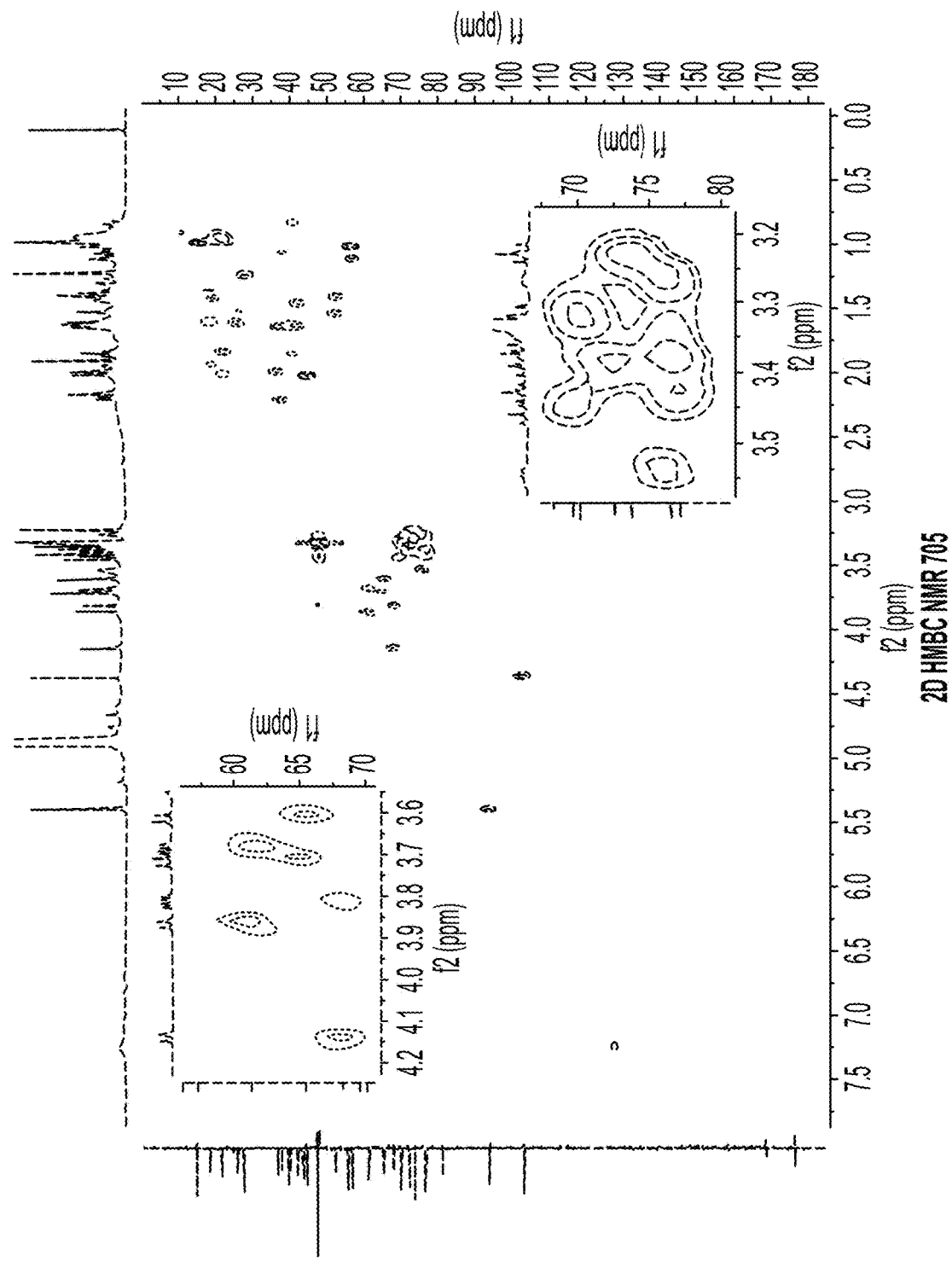
FIG. 14 (CON'T)

NEGATIVE MARKER
335.2 m/z
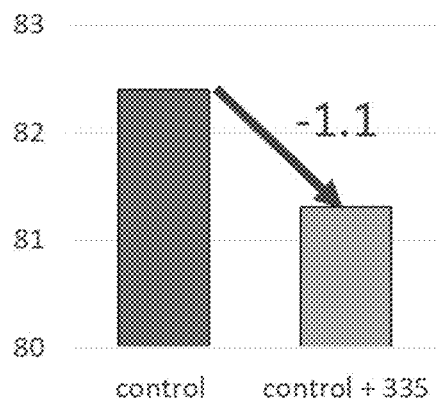
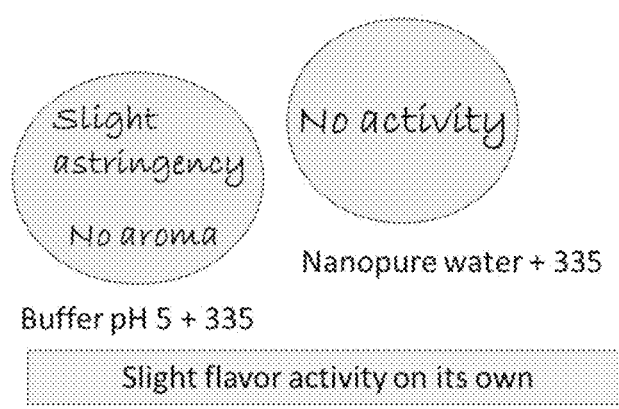
Buffer pH 5 + 335: Slight astringency, No aroma
Nanopure water + 335: No activity
Slight flavor activity on its own
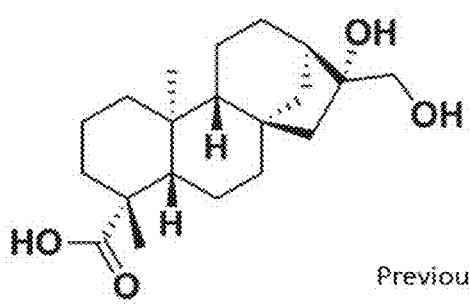
ent-16α,17-dihydroxy-kauran-19-oic acid
Chemical Formula: $C_{20}H_{32}O_4$
Exact Mass: 336.23
Previously identified in roasted coffee; flavor function not known (Obermann et al. 1975)
FIG. 15

FIG. 15 (CON'T)

MARKER PRESENCE IN GREEN BEAN

| Correlation to cupping score | Marker m/z | Presence in GB |
|---|---|---|
| Positive | 437.1 | Yes |
|  | 419.1 | nd |
|  | 671.3 | Yes |
| Negative | 333.2 | nd |
|  | 335.2 | Yes |
|  | 351.2 | Yes |
|  | 705.3 | Yes | nd= not detected

METHOD OF ENHANCING FLAVOR QUALITIES OF COFFEE USING NOVEL SMALL MOLECULES

CROSS REFERENCE TO RELATED APPLICATIONS

This application is a continuation of U.S. application Ser. No. 17/277,465 filed Mar. 18, 2021, now U.S. Pat. No. 11,856,975, which is a national stage application filed under 35 U.S.C. § 371 of PCT/US2019/051780 filed Sep. 18, 2019, which claims the benefit of priority to U.S. Provisional Patent Application Ser. No. 62/732,856 filed Sep. 18, 2018, U.S. Provisional Patent Application Ser. No. 62/740,749 filed Oct. 3, 2018, U.S. Provisional Patent Application Ser. No. 62/802,862 filed Feb. 8, 2019, and U.S. Provisional Patent Application Ser. No. 62/817,804 filed Mar. 13, 2019, the disclosures of which are expressly incorporated herein by reference in their entireties.

FIELD OF THE INVENTION

The invention is the isolation of flavor enhancing components of coffee, and the use of these compounds to improve the overall quality of a coffee and related beverages.

BACKGROUND

The production, trade, and consumption of coffee has changed in this current "third wave of coffee" era that has moved from a pure commodity to a specialty product (Samoggia & Riedel, 2018). A leading driver of this trend is the demand for higher flavor quality coffee (Giacalone, Fosgaard, Steen, & Münchow, 2016). A common practice in the coffee industry to assess the flavor quality of coffee beans (brew) is using the 'cup score' method of the Specialty Coffee Association (SCA). Evaluated by certified Q-graders, the SCA quality score is composed of ten sensory metrics including fragrance/aroma, acidity, body, flavor, sweetness, clean cup, balance, aftertaste, uniformity, and overall impression (SCA, 2018). This method was developed to provide consistency of the quality rating and supports criteria for establishing retail price (Pereira et al. 2017). However, a lack of knowledge on the chemical drivers of coffee quality remains as only a few studies have related cup score to flavor chemistry (Craig, Botelho, Oliveira, & Franca, 2018; Tolessa, Rademaker, De Baets, & Boeckx, 2016).

The chemical composition of coffee brew is known to consist of a complex mixture of thousands of compounds endogenous to the green coffee beans or generated during post-harvest fermentation or roasting steps (Clifford, 1985). Thermal generation of flavor during roasting is known to be highly dependent on the green bean composition and the degree of roasting which impact the flavor of the final brew (Buffo & Cardelli-Freire, 2004). Several factors from farm to cup are known to influence coffee flavor quality such as species/cultivars, geographical origin, green bean processing method, roasting and storage (Feria-Morales, 2002; Sunarharum, Williams, & Smyth, 2014).

Chemical predictors of coffee quality, in both green coffee beans and brew, have been investigated. Some work has been done to establish correlations between non-volatile compounds such as sugars, amino acids, phenolic compounds and fatty acids on the quality of green and roasted coffee beans (Kwon et al., 2015; Ribeiro, Ferreira, & Salva, 2011; Tolessa et al., 2016). Similarly, in coffee brew, the volatile aroma composition has been primarily studied and drivers of quality have been explored (Dorfner et al., 2003). For example, high amounts of unsaturated aldehydes such as (E,E)-2,4-nonadienal and (E,Z)-2,4-heptadienal have been associated with high quality coffee brews. Conversely, high levels of 2-phenylacetaldehyde, 2-methyl-5-propylpyrazine were associated with lower quality coffee (Piccino et al. 2014). Researchers have traditionally used 'targeted' flavor characterization approaches for compound discovery, limiting investigations to unimodal responses such as aroma or taste profiles.

However more understanding of compounds that impact coffee quality and specifically the SCA cup score is needed.

BRIEF DESCRIPTION OF THE FIGURES

FIG. 1 depicts an experimental approach to identify flavor enhancing compounds in coffee.

FIG. 7 depicts the specific flavor improvements in coffee, while also showing that the flavor enhancing compound, apart from coffee, does not produce any olfactory sensation.

FIG. 8 depicts the retention time and m/z for certain flavor enhancing and flavor diminishing compounds.

FIG. 9 depicts quantitative profiles of compounds correlating with increasing cup score, and compounds correlating with decreasing cup score.

FIGS. 10 and 11 depict the specific flavor enhancing effect of certain compounds.

FIGS. 12 and 13 depict the general flavor reduction achieved with certain compounds.

FIGS. 14 and 15 depict the specific flavor reducing effect of certain compounds.

DETAILED DESCRIPTION

Figure 2:
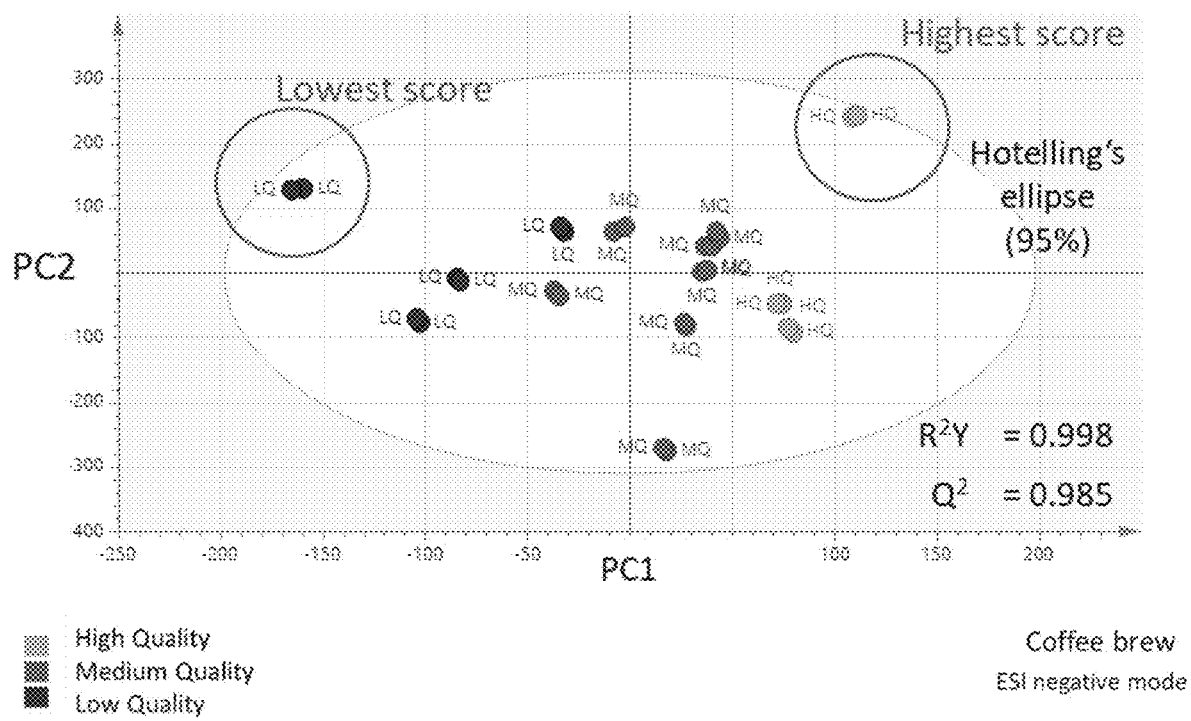
FIG. 2 depicts a process for selecting markers responsible for improving coffee quality.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes, from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The term "alkyl" as used herein is a branched or unbranched hydrocarbon group such as methyl, ethyl, n-propyl, isopropyl, n-butyl, isobutyl, t-butyl, pentyl, hexyl, heptyl, octyl, nonyl, decyl, dodecyl, and the like. The alkyl group can also be substituted or unsubstituted. Unless stated otherwise, the term "alkyl" contemplates both substituted and unsubstituted alkyl groups. The alkyl group can be substituted with one or more groups including, but not limited to, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol. An alkyl group which contains no double or triple carbon-carbon bonds is designated a saturated alkyl group, whereas an alkyl group having one or more such bonds is designated an unsaturated alkyl group. Unsaturated alkyl groups having a double bond can be designated alkenyl groups, and unsaturated alkyl groups having a triple bond can be designated alkynyl groups. Unless specified to the contrary, the term alkyl embraces both saturated and unsaturated groups.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is replaced with a heteroatom such as, but not limited to, nitrogen, oxygen, sulfur, selenium or phosphorus. The cycloalkyl group and heterocycloalkyl group can be substituted or unsubstituted. Unless stated otherwise, the terms "cycloalkyl" and "heterocycloalkyl" contemplate both substituted and unsubstituted cyloalkyl and heterocycloalkyl groups. The cycloalkyl group and heterocycloalkyl group can be substituted with one or more groups including, but not limited to, alkyl, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol. A cycloalkyl group which contains no double or triple carbon-carbon bonds is designated a saturated cycloalkyl group, whereas an cycloalkyl group having one or more such bonds (yet is still not aromatic) is designated an unsaturated cycloalkyl group. Unless specified to the contrary, the term cycloalkyl embraces both saturated and unsaturated, non-aromatic, ring systems.

The term "aryl" as used herein is an aromatic ring composed of carbon atoms. Examples of aryl groups include, but are not limited to, phenyl and naphthyl, etc. The term "heteroaryl" is an aryl group as defined above where at least one of the carbon atoms of the ring is replaced with a heteroatom such as, but not limited to, nitrogen, oxygen, sulfur, selenium or phosphorus.

The aryl group and heteroaryl group can be substituted or unsubstituted. Unless stated otherwise, the terms "aryl" and "heteroaryl" contemplate both substituted and unsubstituted aryl and heteroaryl groups. The aryl group and heteroaryl group can be substituted with one or more groups including, but not limited to, alkyl, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol.

Exemplary heteroaryl and heterocyclyl rings include: benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyl, cirrnolinyl, decahydroquinolinyl, 2H,6H~1,5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, and xanthenyl.

The terms "alkoxy," "cycloalkoxy," "heterocycloalkoxy," "cycloalkoxy," "aryloxy," and "heteroaryloxy" have the aforementioned meanings for alkyl, cycloalkyl, heterocycloalkyl, aryl and heteroaryl, further providing said group is connected via an oxygen atom.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. Unless specifically stated, a substituent that is said to be "substituted" is meant that the substituent can be substituted with one or more of the following: alkyl, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol. In a specific example, groups that are said to be substituted are substituted with a protic group, which is a group that can be protonated or deprotonated, depending on the pH.

Acceptable salts are salts that retain the desired flavor enhancing activity of the parent compound and do not impart undesirable toxicological effects. Examples of such salts are acid addition salts formed with inorganic acids, for example, hydrochloric, hydrobromic, sulfuric, phosphoric, and nitric acids and the like; salts formed with organic acids such as acetic, oxalic, tartaric, succinic, maleic, fumaric, gluconic, citric, malic, methanesulfonic, p-toluenesulfonic, napthalenesulfonic, and polygalacturonic acids, and the like; salts formed from elemental anions such as chloride, bromide, and iodide; salts formed from metal hydroxides, for example, sodium hydroxide, potassium hydroxide, calcium hydroxide, lithium hydroxide, and magnesium hydroxide; salts formed from metal carbonates, for example, sodium carbonate, potassium carbonate, calcium carbonate, and magnesium carbonate; salts formed from metal bicarbonates, for example, sodium bicarbonate and potassium bicarbonate; salts formed from metal sulfates, for example, sodium sulfate and potassium sulfate; and salts formed from metal nitrates, for example, sodium nitrate and potassium nitrate. Pharmaceutically acceptable and non-pharmaceutically acceptable salts may be prepared using procedures well known in the art, for example, by reacting a sufficiently basic compound such as an amine with a suitable acid comprising a physiologically acceptable anion. Alkali metal (for example, sodium, potassium, or lithium) or alkaline earth metal (for example, calcium) salts of carboxylic acids can also be made.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture. Compounds described herein can contain one or more asymmetric centers and, thus, potentially give rise to diastereomers and optical isomers. Unless stated to the contrary, the present invention includes all such possible diastereomers as well as their racemic mixtures, their substantially pure resolved enantiomers, and all possible geometric isomers.

The perceived quality of a cup of coffee is impacted both by the specific flavors in the coffee, as well as the aroma of the coffee. Differences in aroma are perceived by the olfactory system. Differences in flavor are perceived in the gustation system, in which compounds interact with taste bud pores in the alimentary system. Differences in flavor are perceived by the somatosensory system, which can occur anywhere in the body, relating to or denoting sensations such as pressure, pain, or temperature. Chemesthesis is the direct activation of somatosensory nerves by chemical stimuli. The combination of these senses contribute to the overall perceived quality of the coffee. The quality of a particular cup of coffee can be assessed using the Cup Score system, established by the Specialty Coffee Association ("SCA"), and determined by one or more certified industrial Q graders. The maximum cup score is 100. Coffee can be broken in to two general categories based on cup score of 'sub-specialty' (less then 80) and 'specialty coffee' (equal to or greater than 80); within the specialty coffee, further categories are designated with increasing cup score, such as very good specialty (80-84.99), excellent specialty (85-89.99), and outstanding specialty (90-100) according to SCA cupping method; generally commercial samples in North America range in cup score between 75-90. Three quality groups based on cup score were assigned: high quality coffee has a cup score greater than 85, medium quality coffee has a cup score between 80-84.99, and low quality coffee has a cup score less than 80.

In certain embodiments, the compounds disclosed herein may be added to an already brewed cup of coffee to enhance its quality. For instance, a low quality coffee may be converted to a medium or high quality coffee, a medium quality coffee may be converted to a high quality coffee, and a high quality coffee may be further enhanced to have an even high cup score. In certain embodiments, the compounds disclosed herein may be added in order to enhance the cup score by at least 5%, at least 10%, at least 15%, and least 20%, or at least 25%, relative to the cup score of the starting coffee. In further embodiments, the compounds disclosed herein may be added to give a final coffee having a cup score from 80-100, from 85-100, from 87.5-100, from 90-100, from 92.5-100, from 95-100, or from 97.5-100.

In some embodiments, the compounds disclosed herein may be added to coffee beans, fermented coffee bean, roasted coffee beans, or ground coffee beans in order to enhance the quality of a coffee cup obtained from said beans. For instance, a low quality coffee bean may be converted to a medium or high quality coffee bean, a medium quality coffee bean may be converted to a high quality coffee bean, and a high quality coffee bean may be further enhanced to provide an even high cup score. In certain embodiments, the compounds disclosed herein may be added to the beans in order to enhance the cup score of a coffee cup obtained therefrom by at least 5%, at least 10%, at least 15%, and least 20%, or at least 25%, relative to the cup score of the coffee. In further embodiments, the compounds disclosed herein may be added to give a final coffee having a cup score from 80-100, from 85-100, from 87.5-100, from 90-100, from 92.5-100, from 95-100, or from 97.5-100.

The flavor enhancing compounds may be added to coffee beans or grounds to increase the concentration of the compounds relative to unadulterated coffee beans or grounds. For instance, the disclosed compounds may be added, for instance in an amount of at least 5 mg/kg, at least 10 mg/kg, at least 20 mg/kg, at least 30 mg/kg, at least 40 mg/kg, at least 50 mg/kg, at least 60 mg/kg, at least 70 mg/kg, at least 80 mg/kg, at least 90 mg/kg, at least 100 mg/kg, at least 200 mg/kg, at least 300 mg/kg, at least 400 mg/kg, or at least 500 mg/kg relative to the total weight of the coffee beans or grounds. In some embodiments, the disclosed compounds can be added to soluble (i.e., instant) coffee compositions in similar amounts. In other embodiments, the disclosed compounds may be added in an amount from 5-50 mg/kg, from 50-100 mg/kg, from 100-200 mg/kg, from 100-500 mg/kg, from 100-1,000 mg/kg, from 250-500 mg/kg, from 250-750 mg/kg, from 250-1,000 mg/kg, or from 500-1,000 mg/kg.

The compounds may be added to coffee beans, grinds and/or soluble (i.e., instant) coffee compositions in a variety of different manners. In some instances, the compounds may be directly admixed with dry beans, grinds and/or soluble coffee compositions in the concentrations described above. In other embodiments, the compounds may be dissolved or dispersed in a solvent, either water or organic solvent, and then combined with the beans or grinds for a time sufficient to impart the desired concentration of compounds in the beans or grinds.

The compounds may be combined with coffee during various stages of its processing. For instance, the compounds may be added prior to roasting, during roasting, after roasting, prior to fermentation, during fermentation, after fermentation, prior to grinding, during grinding, after grinding, prior to brewing, during brewing, after brewing, or after brewing and drying.

Coffee beans, e.g., green coffee beans, can be fermented with any of Gram-negative bacteria, bacilli, yeasts and filamentous fungi, acetic acid bacteria and lactic acid bacteria in the presence of the compounds disclosed herein. In some embodiments, the compounds can be directly added to the fermentation broth.

The disclosed compounds may be added to an already brewed beverage such that the final concentration of the compound is from 0.01-100 mg/L, from 0.1-100 mg/L, from 0.5-50 mg/L, from 0.5/25 mg/L, from 0.5-15 mg/L, from 1-15 mg/L, from 5-15 mg/L, or from 5-10 mg/L.

In yet further embodiments, the compounds disclosed herein may be used as molecular targets for breeding programs to obtain coffee beans enriched with the compounds. The breeding programs can encompass natural processes such as cross-breeding and selective environmental pressure, as well as recombinant techniques. The compounds disclosed herein may be used as markers for coffee producers to improve their processes for harvesting, roasting, and processing in order to increase the concentration of the compounds in the coffee. The compounds may further be used to screen and develop fermentation cultures for enhancing production of the compounds.

In certain embodiments, the compounds can be a caffeic ester having the formula:

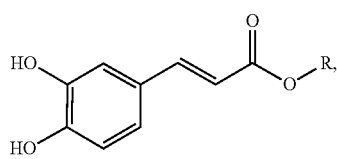

wherein R is $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$ heterocyclyl. In certain preferred embodiments, R can be a $C_{3-8}$cycloalkyl or aryl group having the formula:

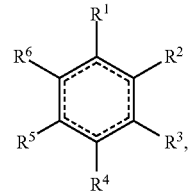

wherein one of $R^1$, $R^2$, $R^3$, $R^4$, $R^5$, or $R^6$ represents a bond to the cinnamoyl group, ┊ independently represents a single or double bond, as permitted by valence, and the remaining five groups are selected from hydrogen, OH, C(O)OH, O—$C_{1-8}$alkyl, C(O)O—$C_{1-8}$alkyl, $C_{1-8}$alkyl, $CH_2OH$, and $CH_2OC_{1-8}$alkyl.

In some embodiments, R can be a cyclitol group. As used herein, a cyclitol group is a cycloalkyl group, preferably a $C_6$ cycloalkyl group having at least two hydroxyl groups. For instance, R can be a bornesitol group connected to the cinnamoyl group at the 1, 2, 3, 4, or 5 hydroxyl position; R can be a conduritol group connected to the cinnamoyl group at the 1, 2, 3, or 4 hydroxyl position; R can be a inositol group connected to the cinnamoyl group at the 1, 2, 3, 4, 5, or 6 hydroxyl position; R can be a pinitol group connected to the cinnamoyl group at the 1, 2, 3, 4, or 5 hydroxyl position; R can be a pinpollitol group connected to the cinnamoyl group at the 1, 2, 4, or 5 hydroxyl position; R can be a quebrachitol group connected to the cinnamoyl group at the 1, 2, 3, 4, or 5 hydroxyl position; R can be a quinic acid group connected to the cinnamoyl group at the 1, 3, 4, or 5 hydroxyl position; R can be a shikimic acid group connected to the cinnamoyl group at the 3, 4, or 5 hydroxyl position; R can be a valienol group connected to the cinnamoyl group at the 1, 2, 3, or 4 hydroxyl position; or R can be a viscumitol group connected to the cinnamoyl group at the 1, 2, 3, 4, or 5 hydroxyl position. When R is quinic acid or shikimic acid, the carboxylic acid group may be further esterified, such as with a $C_{1-8}$alkyl group.

In some embodiments, the flavor enhancing compounds can have the structure:

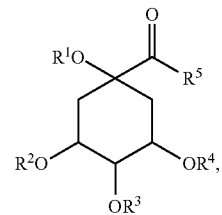

wherein one of $R^1$, $R^2$, $R^3$, or $R^4$ is a caffeic acid derivative having the formula:

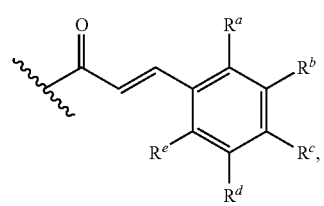

wherein $R^a$, $R^b$, $R^c$, $R^d$, and $R^e$ are independently selected from F, Cl, Br, I, nitro, R, OR, $N(R)_2$, $SO_2R$, $SO_2N(R)_2$, C(O)R; C(O)OR, OC(O)R; $C(O)N(R)_2$, N(R)C(O)R, $OC(O)N(R^{1b'})_2$, $N(R)C(O)N(R)_2$, wherein R is in each case independently selected from hydrogen, $C_{1-8}$alkyl, $C_{2-8}$ alkenyl, $C_{2-8}$alkynyl, aryl, $C_{1-8}$heteroaryl, $C_{3-8}$cycloalkyl, or $C_{1-8}$ heterocyclyl; the remaining $R^1$, $R^2$, $R^3$, and $R^4$ are independently selected from hydrogen, C(O)R; C(O)OR, and $C(O)N(R)_2$, wherein R is in each case independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$ heterocyclyl;

$R^5$ is selected from OR or $NR_2$, wherein R is independently selected from hydrogen, $C_{1-8}$alkyl, $C_{2-8}$alkenyl, $C_{2-8}$alkynyl, aryl, $C_{1-8}$heteroaryl, $C_{3-8}$cycloalkyl, or $C_{1-8}$ heterocyclyl; or wherein $R^5$ may form a bond with any of $R^1$, $R^2$, $R^3$, or $R^4$.

In some instances, it is preferred that $R^5$ is a group having the formula $-O-C_{1-6}$alkyl. Exemplary $C_{1-6}$alkyl include methyl, ethyl, n-propyl, isopropyl, n-butyl, isobutyl, sec-butyl, and t-butyl. It can also be preferred that each of the $R^1$, $R^2$, $R^3$, or $R^4$ that is not the caffeic acid derivative will be hydrogen. For instance, $R^4$ can be the caffeic acid derivative and each of $R^1$, $R^2$, $R^3$, and $R^5$ are hydrogen. In other instances, $R^3$ can be the caffeic acid derivative and each of $R^1$, $R^2$, $R^4$, and $R^5$ are hydrogen. In further embodiments, $R^2$ can be the caffeic acid derivative and each of $R^1$, $R^3$, $R^4$, and $R^5$ are hydrogen.

In other embodiments, $R^4$ is C(O)R, wherein R is $C_{1-6}$alkyl. Exemplary $C_{1-6}$alkyl groups include methyl, ethyl, n-propyl, isopropyl, n-butyl, isobutyl, sec-butyl, and t-butyl, and isobutyl is often preferred.

In other embodiments, $R^3$ is C(O)R, wherein R is $C_{1-6}$alkyl. Exemplary $C_{1-6}$alkyl groups include methyl, ethyl, n-propyl, isopropyl, n-butyl, isobutyl, sec-butyl, and t-butyl, and isobutyl is often preferred. In further embodiments, $R^3$ can be C(O)R as defined above, $R^4$ is hydrogen, and $R^2$ is a caffeic acid derivative. In preferred embodiments, the caffeic acid derivative is the compound wherein $R^b$ and $R^c$ are each hydroxyl, and $R^a$, $R^d$, and $R^e$ are each hydrogen.

In some embodiments, $R^4$ and $R^5$ will together form a bond, yielding a lactone compound having the formula:

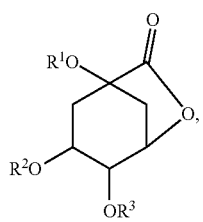

wherein $R^1$, $R^2$, and $R^3$ have the meanings given above. In other embodiments, $R^5$ and $R^4$ can form a bond, $R^5$ and $R^3$ can form a bond, or $R^5$ and $R^1$ can form a bond.

It is believed the above described lactone compounds do not occur in significant amounts in natural coffee, but instead arise from dehydrative cyclization during the roasting sequence. In some instances therefore, compounds that do not include the lactone functionality, e.g., none of $R^1$, $R^2$, $R^3$, or $R^4$ form a bond with $R^5$, can be added to coffee beans or grinds prior to roasting in order to increase the concentration of the lactone compounds post-roasting.

In some instances, the flavor enhancing compounds will have the formula:

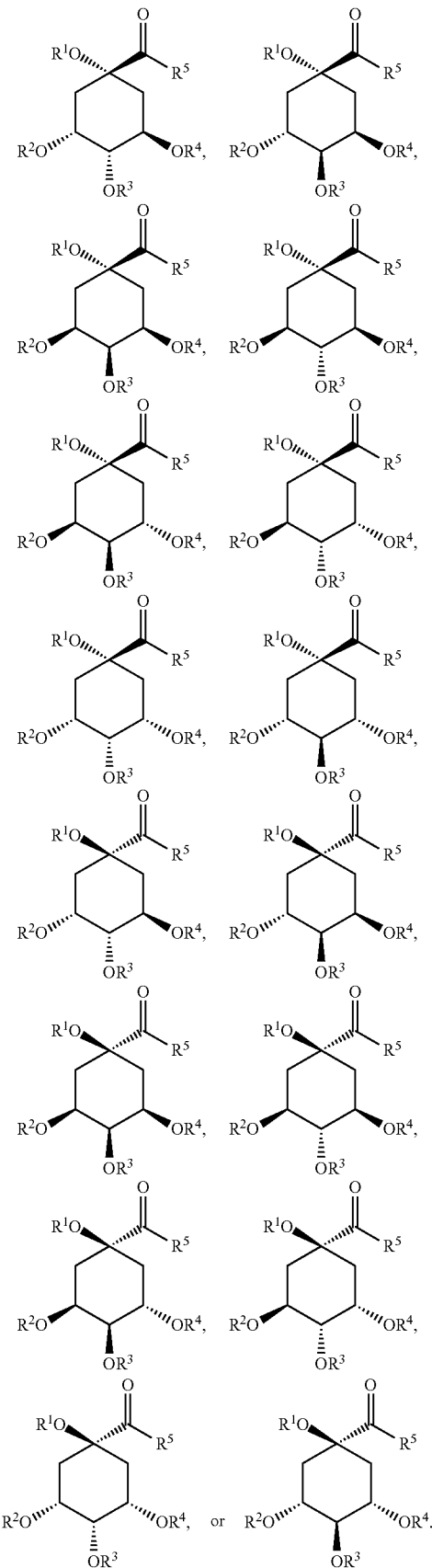

wherein $R^1$, $R^2$, $R^3$, $R^4$, and $R^5$ are as defined above. The above compound may be present as a racemic mixture or an enantioenriched compounds, for instance, having an enantiomeric excess ee of at least 75%, 80%, 85%, 90%, 95%, 97.5%, 99%, or 99.5%. In preferred embodiments of the above compound, $R^3$ is C(O)R, wherein R is $C_{1-6}$alkyl. Exemplary $C_{1-6}$alkyl groups include methyl, ethyl, n-propyl, isopropyl, n-butyl, isobutyl, sec-butyl, and t-butyl, and isobutyl is often preferred. In further embodiments, $R^3$ can be C(O)R as defined above, $R^4$ is hydrogen, and $R^2$ is a caffeic acid derivative. In preferred embodiments, the caffeic acid derivative is the compound wherein $R^b$ and $R^c$ are each hydroxyl, and $R^a$, $R^d$, and $R^e$ are each hydrogen.

In certain embodiments, the flavor enhancing compounds will include reduced amounts of, or not include any, ent-kaurane type diterpenoids. Such compounds are known to the those with skill in the art, and typically include a rearranged D-ring structure relative to normal steroid skeletons:

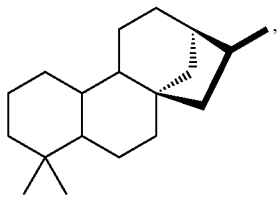 [SMILES: C[C@H]1C[C@@]23CCC4C(CCCC4(C)C)C2CC[C@@H]1C3]

wherein any carbon atom may be substituted with one or more oxygen or alkyl groups, and wherein a single bond may be replaced with a double bond, as permitted by valence.

EXAMPLES

Green coffee beans form the crop year 2015 to 2016 were sourced from importing companies in the United States from multiple origins around the world that included Ethiopia, Brazil, Colombia, Costa Rica, Kenya, Guatemala, Honduras, Sumatra, Rwanda, Uganda, and Vietnam.

Green coffee beans were roasted to the SCA standard for optimal roasting conditions (SCA 2009). Freshly roasted beans were then allowed to degas for two days and then stored in glass bottles closed with PTFE lids after nitrogen flushing at −80° C. Coffee brew (5% ground/water) was prepared from freshly ground coffee beans using a drip-coffee maker (Moccamaster KBT741, Technivorm, Italy). Two biological replicates were prepared for each coffee sample. Sample clean-up was performed on Oasis HLB prime 96-well plate cartridge, 10 mg bed (Waters, Milford, MA, USA). In brief, one ml of coffee brew (60%) was loaded on the cartridge, 500 µl of 5% methanol/water was used to wash the highly polar compounds off the cartridge. In a separate collection plate, 100 µl of 95% acetonitrile/water was then used to elute compounds retained on the cartridge and was further diluted 1:4 with water prior to UPLC/MS analysis.

Untargeted chemical profiling was performed using Ultra High-Performance Liquid Chromatography coupled with a Mass Spectrometer-Ion Mobility-Time of Flight UPLCMS-IM-QToF (Acquity H-Class quaternary flow solvent manager with Synapt G2-S, Waters, MA, USA). Samples were run on a Cortecs UPLC C18+ column (2.1×100 mm, 2.7 µm) kept at 40° C. in a Waters column manager. A flow rate of 0.5 mL/min was used with a tertiary solvent mobile phase consisting of (A) nanopure water, (B) acetonitrile, (C) 5% formic acid. The gradient was as follows: 0-0.5 min, B 5%; 0.5-11 min, B 5-50%; 11-12.5 min, B 50-95%; 12.5-14 min, B 95%; 14-15 min, B 95-5%, 9-10, B 5%; C was constant at 2%. Electrospray ionization (ESI) was run in negative mode with source temperature of 120° C., desolvation temperature of 400° C., capillary voltage was set to 2.5 kV, cone sample 40 V, Tof scan range was 50-1200 m/z and scan time was 0.3 sec for continuum data. Internal reference compound Leucine-enkephalin (m/z 556.2771) was infused by a lock spray during data acquisition for mass correction. Each SPE replicate was injected 2 times in randomized order. Injection volume was 5 µl, with a column standard injected every $10^{th}$ run to check retention time shifts and mass spectrometer performance throughout experiment sequence.

The selected chemical features 4.13_193, 7.00_437, 8.25_671 and 8.52_419 (RT_m/z) were isolated from coffee brew. A total volume of 800 ml of coffee brew was loaded on to four Oasis HLB prime (Waters) 6 g bed cartridges. An initial washing step was performed using 200 ml of 5% methanol/water. Elution was performed in 4 steps using 50 mL of different ratios of methanol/water (40, 60, and 90%) and collected separately. SPE fraction 60% contained features 4.13_193 and 7.00_437 and fraction 90% contained features 8.25_671 and 8.52_419. The fractions were freed from solvent (Rocket Synergy Purge, Genevac, UK) and lyophilized. SPE fraction 60% and fraction 90% methanol isolate were reconstituted in 30%, and 50% methanol/water with 0.1% formic acid, respectively and further isolated by Prep-LCMS fractionation (Waters 2767 fraction collector and MS-TQD) using a 50 mm×50 mm Xbridge Prep C18, 5 µm particle size column (Waters). Solvent gradient was optimized for each SPE fraction. Acquisition was performed in single ion monitoring (SIR) and multiple reaction monitoring (MRM) under negative ESI mode. After isolation, the $1^{st}$-dimension fractions were pooled, removed of solvent (Rocket Synergy Purge, Genevac, UK) and lyophilized. Further $2^{nd}$- and $3^{rd}$-dimension LC purification was performed using a 50×100 mm Xbridge prep 5 µm Shield RP18 column (Waters) and a 10×250 mm Xselect CSH prep 5 µm Phenyl-Hexyl column (Waters), respectively. LC solvent gradient was optimized to obtain the best separation for each feature. Each fraction isolated was injected on to the UPLCMS-IM-QToF Synapt G2-S (Waters) to ensure accurate peak collection. The resultant isolates for each feature was confirmed at >90% purity on the basis of total ion chromatogram peak area determined in MS scan mode in positive and negative ESI.

LC/MS-QTof accurate mass analysis were carried out using a G6545B LC-QTof (Agilent Technologies, Santa Clara, CA). A reverse phase Eclipse Plus C18 (2.1×50 mm, 1.8 µm, Agilent) was kept at 40° C. in a 671767B Multisampler (Agilent). A flow rate of 0.5 mL/min with a binary gradient mobile phase consisting of solvent (A) nanopure water with 0.1% formic acid and (B) acetonitrile with 0.1% formic acid was used. The gradient was as follows: 0-1 min, B 5%; 1-8 min, B 5-95%; 8-9 min, B 95%; 9-10, B 5%. Electrospray ionization was run in negative mode with desolvation gas at 350° C. and sheath gas at 375° C. Capillary voltage was 4.5 kV and nozzle voltage was 500 V. Collision energy of 30, 30, and 40V was used for compound features 7.00_437, 8.52_419 and 8.25_671 (RT_m/z), respectively.

Isolated standards of features 4.13_193, 7.00_437, 8.25_671 and 8.52_419 (RT_m/z) were used to quantify each compound in the brew of the three coffees ranged in cup score of different representative coffee classes (below specialty, very good specialty, and excellent specialty). Quantification was carried out using 5-point external calibration curves for each compound in water and adjusted for the compound extraction recovery from coffee as determined by standard addition (in triplicate). Analyses were carried out using an Acquity H-Class UPLC system coupled to a Xevo-TQ-S Mass Spectrometer (Waters). A reverse phase BEH C18 (2.1×50 mm, 1.6 µm, Waters) was kept at 40° C. in a Waters column manager. A flow rate of 0.5 mL/min with a binary gradient mobile phase consisting of solvent (A) nanopure water with 0.1% formic acid and (B) acetonitrile with 0.1% formic acid. The gradient was as follows: 0-0.5 min, B 5%; 0.5-6 min, B 5-50%; 6-7 min, B 50%; 7-8 min, B 50-95%; 8-8.5 min, B 95%; 8.5-9 min, B 95-5%, 9-10, B 5%. Electrospray ionization was run in negative mode with a source temperature of 120° C., desolvation temperature of 550° C., capillary 2.3 kV, and sample cone 20 V. Optimized MRM condition of each compound are presented in Table 1. Methylparaben (internal standard) was monitored in ESI negative mode using the transition 153→93 m z.

The relative concentrations of all four compounds for each feature 4.13_193, 7.00_437, 8.25_671 and 8.52_419 (RT_m/z) were determined in the green and roasted coffee beans. Five grams of green and roasted coffee beans were cryogenically ground with liquid nitrogen for 20 seconds into fine powder. Ground samples (0.25 g) were accurately weighed intro 2 ml Eppendorf tubes, and 1.5 ml of a tri-solvent mixture consisting of acetonitrile:methanol:water (2:2:1 v/v) and 25 µl of methyl paraben in methanol was added, internal standard (final concentration of 20 mg/L). Each tube was mixed to ensure homogeneity then shaken at 200 rpm for 1 hour (MaxQ 416 HP Benchtop shaker, Thermo Scientific Dubuque, IA). The tubes were subsequently centrifuged for 15 mins at 10,000 rpm and the supernatant liquid (250 µl) was diluted with 1.75 ml of water then subjected to sample clean-up was performed on a SPE 96-well plate Oasis HLB prime cartridge, 30 mg. One ml of the diluted bean extract was loaded on the cartridge and 500 µl of 5% methanol/water in water was used to wash the cartridge. In a separate collection plate, 200 µl of 95% acetonitrile/water was then used to elute the compounds retained on the column. The collected retentate was diluted to 1 ml with water for UPLC/MS/MS analysis.

| Samples/Source | H₂O content | Green Bean Extract Average (std) | Roasted Bean Extract Average (std) | Cupping score |
|---|---|---|---|---|
| Excellent | | | | |
| Ethiopia/Sweet Maria | 9.6 | 14.90 (1.53) | 4.57 (0.64) | 87.79 |
| Kenya/Sweet Maria | 9.9 | 13.18 (2.16) | 4.57 (0.95) | 86.42 |
| Colombia/Sweet Maria | 10.8 | 9.82 (2.03) | 3.33 (0.43) | 86 |
| Rawanda/Sweet Maria | 10.2 | 11.87 (1.33) | 4.88 (1.26) | 85.4 |
| Very good | | | | |
| Guatemalan/Sweet Maria | 11.1 | 6.68 (0.37) | 2.54 (0.63) | 84.33 |
| 2450 Sumatra/Keurig | 10.3 | 9.01 (.76) | 2.43 (0.14) | 83.65 |
| 2122 FT Colombian/Keurig | 10 | 9.15 (1.19) | 3.29 (0.41) | 83.48 |
| 2333 FT Kenyan//Keurig | 10 | 15.73 (1.71) | 5.11 (0.66) | 83.43 |
| 2042 Guatemala/Keurig | 8.7 | 9.04 (1.28) | 2.50 (0.25) | 82.95 |
| Vietnam 2500/Keurig | 9.9 | 6.17 (0.99) | 2.93 (0.36) | 82.43 |
| Costa Rica 2020/Keurig | 9.8 | 6.65 (1.28) | 1.93 (0.41) | 81.13 |
| 2127 Colombian/Keurig | 9.9 | 8.37 (1.00) | 2.22 (0.33) | 81.06 |
| Brazil 2001/Keurig | 9.8 | 6.19 (0.61) | 1.09 (0.12) | 79.98 |
| Below specialty quality | | | | |
| Honduras/Paragon | 10.1 | 7.36 (0.91) | 2.46 (0.40) | 79.87 |
| Colombia/Paragon | 9.8 | 9.89 (0.56) | 4.18 (0.19) | 79.6 |
| FT Brazil 2064/Keurig | 9.8 | 5.06 (0.66) | 1.30 (0.11) | 76.63 |
| Brazil/Paragon | 9.9 | 5.39 (1.16) | 2.08 (0.38) | 75.8 |
| Uganda 2021/Keurig | 10.2 | 15.00 (2.55) | 3.49 (0.27) | 72.5 |

Example 2: Cup Score Evaluation

The cup score was determined in coded samples using the official SCA cupping protocol (SCA, 2015), with five licensed Q-graders.

Sensory recombination experiments were carried out to demonstrate causality/or validate relevance of compounds statistically correlated to high quality coffee. A coffee with a 78.7 cup score was selected as the control base coffee. Recombination models were prepared with the control coffee spiked with compounds for each feature 4.13_193, 7.00_437, 8.25_671 and 8.52_419 (RT_m/z) to mimic the concentrations of an excellent specialty coffee. The recombination models were prepared with each individual compound and a combination of all 4 compounds (totaling in 5 recombination models) which were evaluated with two control samples. All samples were blind coded, presented in a randomized order and evaluated using the cupping protocol by five certified Q-graders.

The purified compounds were also evaluated individually in water base at concentrations presented in Table 1 for, excellent specialty coffee, in both a buffer (0.025 M phosphate buffer adjusted to pH 5 with 0.1 M citric acid) and unbuffered (nanopure water) system. A consensus panel of four experienced sensory evaluators was used to assess the flavor attributes of the compounds.

| Chemical feature (RT_m/z) | Parent Ion | Product Ions | Sample concentration (mg/L) ± standard deviation | | |
|---|---|---|---|---|---|
| | | | Cup Score = 78.7 (Below specialty) | Cup Score = 82.7 (Very good specialty) | Cup Score = 87.8 (Excellent specialty) |
| 4.13_193 | 193.0 | 149.0, 121.0 | 0.81 ± 0.04$^c$ | 1.24 ± 0.06$^b$ | 1.52 ± 0.00$^a$ |
| 7.00_437 | 437.1 | 173.1, 275.1 | 1.38 ± 0.05$^c$ | 1.99 ± 0.13$^b$ | 3.21 ± 0.07$^a$ |
| 8.52_419 | 419.1 | 161.1, 179.1 | 3.69 ± 0.23$^b$ | 5.89 ± 0.39$^a$ | 7.97 ± 0.12$^a$ |

-continued

| Chemical feature (RT_m/z) | Parent Ion | Product Ions | Sample concentration (mg/L) ± standard deviation | | |
|---|---|---|---|---|---|
| | | | Cup Score = 78.7 (Below specialty) | Cup Score = 82.7 (Very good specialty) | Cup Score = 87.8 (Excellent specialty) |
| 8.25_671 | 671.3 | 221.1, 207.0 | 2.08 ± 0.04[c] | 5.53 ± 0.39[b] | 11.68 ± 0.26[a] |

NMR spectra were obtained using a Bruker Advance III HD Ascend spectrometer equipped with a 5 mm triple resonance observe TXO cryoprobe with z-gradients, operating at 700 MHz for the $^1$H nucleus and 176 MHz for the $^{13}$C nucleus. (Bruker BioSpin, Rheinstetten, Germany). Instruments were calibrated using the residual undeuterated solvent as an internal reference $CD_3OD$ $^1$H NMR=3.31 ppm, $^{13}$C NMR=49.0 ppm.

For feature selection, peak intensity was evaluated by one-way ANOVA and when a significant effect was observed ($\alpha$=0.05), post-hoc multiple comparison tests were performed. Cup scores of sensory recombination models were evaluated by two-way ANOVA and when significant effect was observed ($\alpha$=0.05), Dunnett's test was performed compared to the control coffee. Statistical analyses were conducted with JMP® Pro 13 (SAS Institute Inc. Carry, NC).

The overall goal of this study was to identify chemical compounds that positively impact the SCA cup score of coffee. Eighteen green coffee bean samples of various geographic origins were sourced and categorized by cup score and further into three quality classifications: below specialty (<80), very good specialty (80-85), and excellent specialty (85-90) according to SCA cupping method by certified Q-graders.

The LC/MS profiles of coffee brews were collected, and a total of 2450 chemical features after preprocessing were extracted from the chromatographic data. Multivariate statistical analyses were then applied to establish the relationship between coffee brew chemistry and the cup scores.

Unsupervised principle component analysis (PCA) was modeled with the 2450 features to determine samples outliers and confirmed good reproducibility of data. A supervised orthogonal partial least square (OPLS) model was then used to define predictive coffee compounds that corresponded to the SCA sensory coffee cup score (FIG. 1a). Review of model quality metrics revealed high goodness of fit ($R^2Y$=0.997) and high predictive ability ($Q^2$=0.979). The root mean squared error of prediction (RMSEP) was 0.98 and indicated that the model was able to predict coffee cup score with less than 1 cup score error. Additionally, permutation testing indicated the model was not overfitting (permutated $R^2$=0.6, $Q^2$=–1.4).

Review of the OPLS model showed differentiation of samples by quality class along the first principle component (PC1) from below specialty quality (left) and excellent specialty quality (right), indicating chemical differences observed by LC/MS profiling were able to distinguish the three coffee classes. The chemical features responsible for driving the differences in brew quality from class to class were reviewed based on their contribution and relevance to the model's predictive ability. Multiple criteria were used to the select potential features of cup score, including variables of importance (VIP), covariance or magnitude of intensity change (p[1]) and correlation to cup score (p(corr[1])), and ANOVA. VIP values and/or VIP rank have been successfully used for feature selection of flavor relevant information (Iwasa et al., 2015; Ronningen et al., 2018) A VIP value above 1 of a feature is typically used to indicate a significant contribution to the model (Galindo-Prieto, Eriksson, & Trygg, 2014). The use of correlation and magnitude/fold change is also a common practice for feature selection (Teegarden, Schwartz, & Cooperstone, 2019). However, there is no universal criteria for feature selection as the process is highly dependent on the model. A S-plot based on the covariance of each chemical feature between samples of coffee (p[1]) and the correlation of each feature to the Y-variable, cup score, (p(corr[1])) is shown in FIG. 1b. In this study, among the top 25 VIP features, only those exhibiting a p(corr[1])>0.7 and a p[1]>0.075 were selected. Ultimately, this led to the selection of four features 4.13_193, 7.00_437, 8.25_671 and 8.52_419 (RT_m/z) that were highly predictive and positively correlated to cup score (see in FIG. 1b). These four features were subsequently extracted in high purity (>90%) from coffee brew using multi-dimensional LC to provide standards for quantification, sensory analysis and structural identification.

The concentrations for the four compounds in three coffees samples representative of below specialty, very good and excellent specialty class are shown in Table 1. All the compounds exhibited significant differences among quality classes (p<0.05) with the highest amounts found in excellent specialty brew. The concentration of chemical feature 4.13_193 ranged from 0.81 mg/L in the below specialty coffee to 1.5 mg/L in the excellent specialty coffee, corresponding to 2-fold change between extreme classes. A similar 2-fold change was observed for chemical features 7.00_437 and 8.52_419 exhibiting concentrations from 1.4 and 3.7 mg/L in the below specialty coffee to 3.2 and 7.9 mg/L in the excellent specialty coffee, respectively. Finally, the chemical feature 8.25_671 showed greater difference in concentration with about a 6-fold change between below specialty coffee (2 mg/L) and excellent specialty coffee at (11.7 mg/L, Table 1).

The sensory impact of the four features 4.13_193, 7.00_437, 8.25_671 and 8.52_419 (RT_m/z) was investigated with recombination model analysis that were evaluated by five certified SCA Q-graders. Recombination models were prepared using a control coffee with below specialty cup score (78.7 points) and reconstituted to the levels of an excellent specialty coffee (see Table 1) with the purified compounds. Review of the duplicate blind control samples were not significantly different with a COV of approximately 2%, demonstrating the judge's high level of performance. Overall, the addition of 3 of the 4 compounds individually resulted in significant increases in cupping score (p<0.05) of the excellent specialty recombination models compared to the control sample (FIG. 2). An additional model consisting of all four compounds combined also resulted in significant increases in cupping score.

Figure 19:
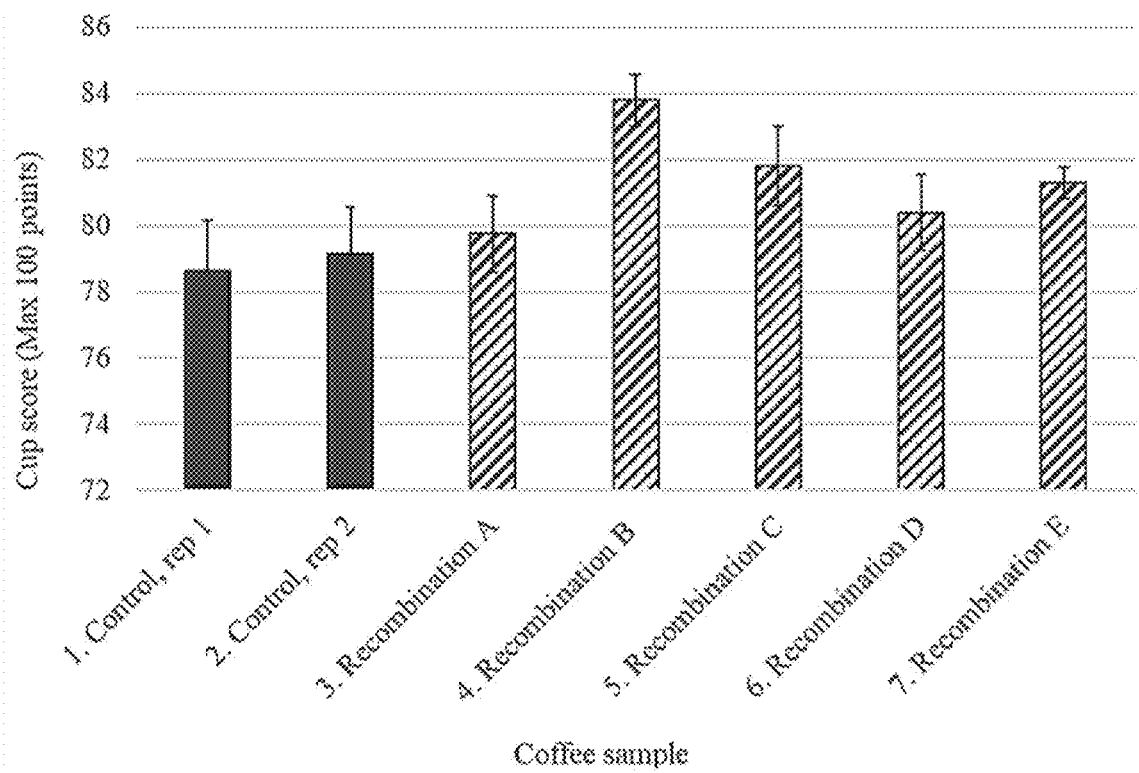
FIG. 19 depicts mean SCA final cup score of the control and recombination samples [control+feature(s); A=4.13_193, B=7.00_437, C=8.52_419, D=8.25_671 (RT_m/z), and E=all 4 features]; panel of 5 q-graders; significant difference from control, rep 1 according to Dunnett test * ($p<0.05$), ** ($p<0.005$).

The addition of 1.8 mg/L (Table 1) the individual feature compound 7.00_437 to the control (below specialty) coffee sample reported the greatest change with an average increase of 5.2 points in cup score (Recombination B, FIG. 19). Whereas, the addition of the feature compounds 8.52_419 (4.3 mg/L) and 8.25_671 (9.6 mg/L) to the control coffee sample increased the cup score by 3.2, and 1.8 points, respectively (Recombination C and D, FIG. 19). Finally the addition of compound 4.13_193 (0.7 mg/L) had no significant difference (Recombination A, FIG. 19). Notably, increasing the compound concentration of features 7.00_437, 8.52_419, and 8.25_671 significantly improved the cup score of the control coffee and confirmed the sensory activity of the selected features. Thus, the addition of these compounds improved the coffee score from a below specialty (<80 points) to a specialty grade coffee (>80 points). Further review of the recombination model consisting of all four compounds reported an average increase in cup score of 2.6 points (Recombination E), which was half of the 5.2-point increase observed for the addition of the recombination sample with the single compound 7.00_437 (Recombination B). Thus, no additive sensory effects among these compounds was observed on the cup score suggested some type of competitive interactions when added as a mixture. To further support a competitive interaction behavior was observed, the mathematical average score for each of the individual compound recombination (A, B, C and D) was calculated and determined to be 81.4 point, which was nearly identical to the score of the recombination sample that included all four compounds of 81.3 points (Recombination E, FIG. 19).

Subsequently the structures of sensory significant feature compounds 7.00_437, 8.25_671 and 8.52_419 (RT_m/z) were characterized using high resolution MS and NMR. Accurate mass analysis of feature 7.00_437 assigned the mass of m/z 437.14532 [M-H]$^-$ with an elemental composition of $C_{21}H_{25}O_{10}$ (Δ 0.05 ppm) and further identified as the novel compound 3-O-caffeoyl-4-O-3-methylbutanoylquinic acid. The $^1$H NMR spectroscopic data displayed the characteristic pattern of a 3,4-dihydroxy cinnamoyl conjugate with three aromatic protons at $δ_H$ 6.87 (d, J=1.9 Hz, 1H), 6.80 (dd, J=7.9, 1.9 Hz, 1H), 6.58 (d, J=7.9 Hz, 1H) and two trans-olefin protons at $δ_H$ 7.56 (d, J=15.7 Hz, 1H) and 6.12 (d, J=15.7 Hz, 1H). The $^1$H NMR spectrum further exhibited signals characteristic of a quinic acid group with three downfield signals at $δ_H$ 5.70, $δ_H$ 5.02, and $δ_H$ 4.24 corresponding to methine protons attached to oxygenated carbons. Key HMBC correlation of H-3/C-9' allowed for confirmation of the link between the cinnamoyl moiety and the quinic acid group located at C-3 and a key weak HMBC correlation of H-4/C-8 allowed for identification of the 3-methylbutanoic ester substituted at the 4-position of the quinic acid. Additionally, MS/MS spectra of 437 revealed fragments of 173 m/z which is characteristic of a 4-substituted chlorogenic acid (CGA) backbone (Clifford et al., 2003) thus further supporting the methylbutanoic acid ester linkage at the 4-position of the CGA backbone. Fragment 335 m/z to a neutral loss of 102 as well as product ion 101 m/z [M-H]$^-$ correspond to the methylbutanoic acid moiety.

For feature 8.52_419 (RT_m/z), an elemental composition $C_{21}H_{23}O_9$ [M-H]$^-$ was assigned based on accurate MS analysis m/z 419.13476 (Δ 0.38 ppm). MS/MS fragmentation of compound revealed fragment ions 101, 179 and 161 m z. An elimination of water from the chlorogenic acid quinic moiety of structure 3-O-caffeoyl-4-O-3-methylbutanoylquinic acid was observed forming a lactone ring and finally identified the novel compound as 3-O-caffeoyl-4-O-3-methylbutanoyl-1,5-quinide using 1D and 2D NMR experiments. Key COSY correlations between methine proton at C10 and methyl protons of C11/C12 were observed to confirm the identification. Lactones of chlorogenic acid have been previously identified in roasted coffee (Schrader, Kiehne, Engelhardt, & Maier, 1996). Lactones are formed exclusively on chlorogenic acids free of substitution on $C_5$ position and its formation is favored for 3-CQA over 4-CQA due to steric hindrance of the ester bond and the equatorial confirmation being more energetically stable on the former (Farah et al. 2005). A similar chlorogenic lactone, 3-O-caffeoyl-γ-quinide, has been identified as bitter-active in coffee using taste-guided fractionation (Frank et al., 2006).

Finally, for the third feature 8.25_671 (RT_m/z), the NMR spectra was not conclusive however accurate MS analysis reported a 671.30730 m/z [M-H]$^-$ with an elemental composition $C_{36}H_{47}O_{12}$. The MS fragmentation pattern indicated the structure consisted of ferulic acid (193 m z), 3,4-dimethoxycinnamate (207 m z) and a methylbutanoate moiety (101 m z).

The impact of each compound on the 10 individual attributes utilized to calculate the cup score was also further evaluated. Addition of compounds 3-O-caffeoyl-4-O-3-methylbutanoylquinic acid and 3-O-caffeoyl-4-O-3-methylbutanoyl-1,5-quinide significantly increased flavor, aroma, aftertaste, acidity, body, balance, and overall impression attribute scores which led to a significant increase in resultant cup score by 5.2 and 3.2 points, respectively. Increase in the overall impression attribute was the biggest contributor to the significant increase in total cupping score of the recombination models (p<0.05). This attribute increased by 1.1, 0.85, 0.7 points for recombination model B (3-O-caffeoyl-4-O-3-methylbutanoylquinic acid), C (3-O-caffeoyl-4-O-3-methylbutanoyl-1,5-quinide), and D (feature 8.25_671) respectively, compared to the control sample which was given 6.5 out of 10 points. Attributes uniformity, sweetness, and clean cup did not significantly change in the models compared to the control, for all recombination models.

| Attribute | Control | Recombination A | Recombination B | Recombination C | Recombination D | Recombination E |
|---|---|---|---|---|---|---|
| Fragrance/Aroma | 7.20 ± 0.21 | 7.15 ± 0.22 | 7.50 ± 0.18* | 7.45 ± 0.11* | 7.25 ± 0.18 | 7.40 ± 0.14 |
| Flavor | 6.95 ± 0.27 | 7.15 ± 0.14 | 7.85 ± 0.14* | 7.50 ± 0.31* | 7.3 ± 0.21 | 7.40 ± 0.14* |
| Aftertaste | 6.90 ± 0.38 | 7.15 ± 0.14 | 7.75 ± 0.25* | 7.35 ± 0.29* | 7.15 ± 0.14 | 7.30 ± 0.11* |
| Acidity | 6.90 ± 0.38 | 7.10 ± 0.14 | 7.7 ± 0.18* | 7.35 ± 0.22* | 7.25 ± 0.25* | 7.35 ± 0.22* |
| Body | 7.10 ± 0.14 | 7.10 ± 0.14 | 7.60 ± 0.29* | 7.40 ± 0.14* | 7.10 ± 0.14 | 7.35 ± 0.14* |
| Uniformity | 10 ± 0 | 10 ± 0 | 10 ± 0 | 10 ± 0 | 10 ± 0 | 10 ± 0 |
| Balance | 7.10 ± 0.14 | 7.15 ± 0.14 | 7.75 ± 0.18* | 7.40 ± 0.22* | 7.15 ± 0.22 | 7.20 ± 0.21 |

-continued

| Attribute | Control | Recombination A | Recombination B | Recombination C | Recombination D | Recombination E |
|---|---|---|---|---|---|---|
| Clean cup | 10 ± 0 | 10 ± 0 | 10 ± 0 | 10 ± 0 | 10 ± 0 | 10 ± 0 |
| Sweetness | 10 ± 0 | 10 ± 0 | 10 ± 0 | 10 ± 0 | 10 ± 0 | 10 ± 0 |
| Overall impression | 6.50 ± 0.59 | 6.95 ± 0.6* | 7.60 ± 0.38* | 7.35 ± 0.34* | 7.20 ± 0.33* | 7.30 ± 0.21* |

[a]Control coffee (cup score 78.7) and recombination samples [control + feature(s);
A = 4.13_193,
B = 7.00_437,
C = 8.52_419 or
D = 8.25_671 (RT_m/z),
E = all 4 features];
*Indicate significant difference from control according to Dunnett test (p < 0.05).

In addition to reporting a Q-graders cup score, the certified SCA judges also documented generalized flavor descriptors for the samples evaluated. In general, the recombination samples B, C, D and E (FIG. 19) were observed to modify the retronasal aroma, taste and somatosensory attributes. For example, the recombination models were described with citrus, caramel and lemon fruit notes whereas the control was woody, old and astringent. Flavor attributes such as woody, old, and astringent which are typically associated with undesirable prolong storage of coffee (Bucheli, Meyer, Pittet, Vuataz, & Viani, 1998).

The flavor activity of the three compounds, 3-O-caffeoyl-4-O-3-methylbutanoylquinic acid, 3-O-caffeoyl-4-O-3-methylbutanoyl-1,5-quinide and feature 8.25_671, were also evaluated individually in a coffee model system (buffered water, pH 5.5) at concentrations reported in the excellent specialty coffee by four experienced sensory panelists. No flavor activity (aroma, taste or somatosensory) was reported for all three compounds by any of the judges and thus were deemed flavorless. This observation indicated these compounds were true flavor modulators or neutral-tasting compounds that modify flavor perception (Jelen, 2012). For example, cellotretraose, a tasteless cellooligosaccharride, was found to suppress bitterness of caffeine (Ley, 2008). Compounds in the family of homoeriodictyol, tasteless on their own, have been reported to suppress bitterness perception of caffeine, quinine, and paracetamol (Ley, Blings, Paetz, Krammer, & Bertram, 2006). Others have also reported tasteless compounds can suppress sweetness and bitterness reception (Kurtz and Fuller 1990). In the current study, two of the three compounds identified were chlorogenic acid derivatives with a 3-methylbutanoic ester moiety. Others have also reported the chlorogenic acid compounds modified taste attributes such as sweetness enhancement (Upadhyay and Rao 2013) and bitter inhibition (Riemer, 1993). The addition of 30 ppm of chlorogenic acid from an extract prepared from green coffee beans was found to reduce the metallic and bitter off-taste of an acidic beverage (Chieng et al., 2002). Chlorogenic acid's ability to increase water solubility of certain volatiles has also been demonstrated (King and Solms 1982).

In addition to taste modulation, aroma perception has also been reported to be influence by tasteless compound. Dalton et al. (2000) demonstrated enhanced sensitivity to benzaldehyde and mixed with saccharin at levels below the taste threshold. In accordance with our findings, the changes in cup score and flavor of the recombination samples could be explained by taste modulation, or perceptual taste-aroma interaction. It is unlikely, given the coffee composition, that the addition of compounds at the levels added (low mg/L) in the current study would result in significant physico-chemical interactions between the non-volatile features and coffee volatile aroma compounds (King and Solms 1982). Along this line, Charles et al. (2015) demonstrated that the addition of sugar modified sensory perception of espresso coffee flavor but did not change its aroma release.

Review of the structures of the three compounds identified, 3-O-caffeoyl-4-O-3-methylbutanoylquinic acid, 3-O-caffeoyl-4-O-3-methylbutanoyl-1,5-quinide and feature 8.25_671 indicated the presence of a common 3-methylbutanoic acid moiety. This specific chemical motif may example the observed compound activity to increase the coffee cup score. In its free form, compound 3-methylbutanoic acid has been identified as a potent odorant in roasted coffee, exhibiting odor qualities such as sweaty and fermented (Blank, Sen, & Grosch, 1991; Blank, Sen, & Grosch, 1992; Holscher, Vitzthum, & Steinhart, 1990) and was suggested to contribute to the sour flavor of heated canned coffee drinks (Kumazawa & Masuda, 2003). Approximately a 3-fold higher odor activity of 3-methylbutanoic acid (based on FD-factor) was reported in *Arabica* coffee compared to *Robusta* coffee (Blank et al., 1991). The prevalence of 3-methylbutanoic acid in disease-free green beans has been reported (Toci & Farah, 2008). Iwasa et al. (2015) reported two isomers of 3-methylbutanoyl glycosides in green coffee beans as possible precursors of 3-methylbutanoic acid in the coffee brew. The authors indicated 3-methylbutanoic acid enhanced the attribute 'aftertaste' in the SCA cup score when 0.0925 mg/L was spiked into coffee, however further reported no significant effect on the final cup score (based on a single Q-grader assessment). Bertrand et al. (2012) reported 3-methylbutanoic acid in green beans was associated with low brew quality and positively correlated with green and earthy notes typically associated with defects. In the current study, the release of 3-methylbutanoic acid during consumption was not expected to have played a role in the noted change in cupping scores.

The three identified compounds were quantitatively monitored in green and roasted beans. Both 3-O-caffeoyl-4-O-3-methylbutanoylquinic acid and the phenolic acid derivative feature 8.25_671, were found to be endogenous to the green coffee beans. One possible route for the generation of compound 3-O-caffeoyl-4-O-3-methylbutanoylquinic acid could be arising from the condensation or esterification of chlorogenic acid with 3-methylbutanoic acid which could be generated during the coffee fermentation process or be a microbial product (Feng et al., 2013; Hau Yin Chung, Pui Kwan Fung, & Kim, 2005; Schieberle & Grosch, 1988). Additionally, 3-O-caffeoyl-4-O-3-methylbutanoylquinic acid could be a plant metabolite.

Figure 17:
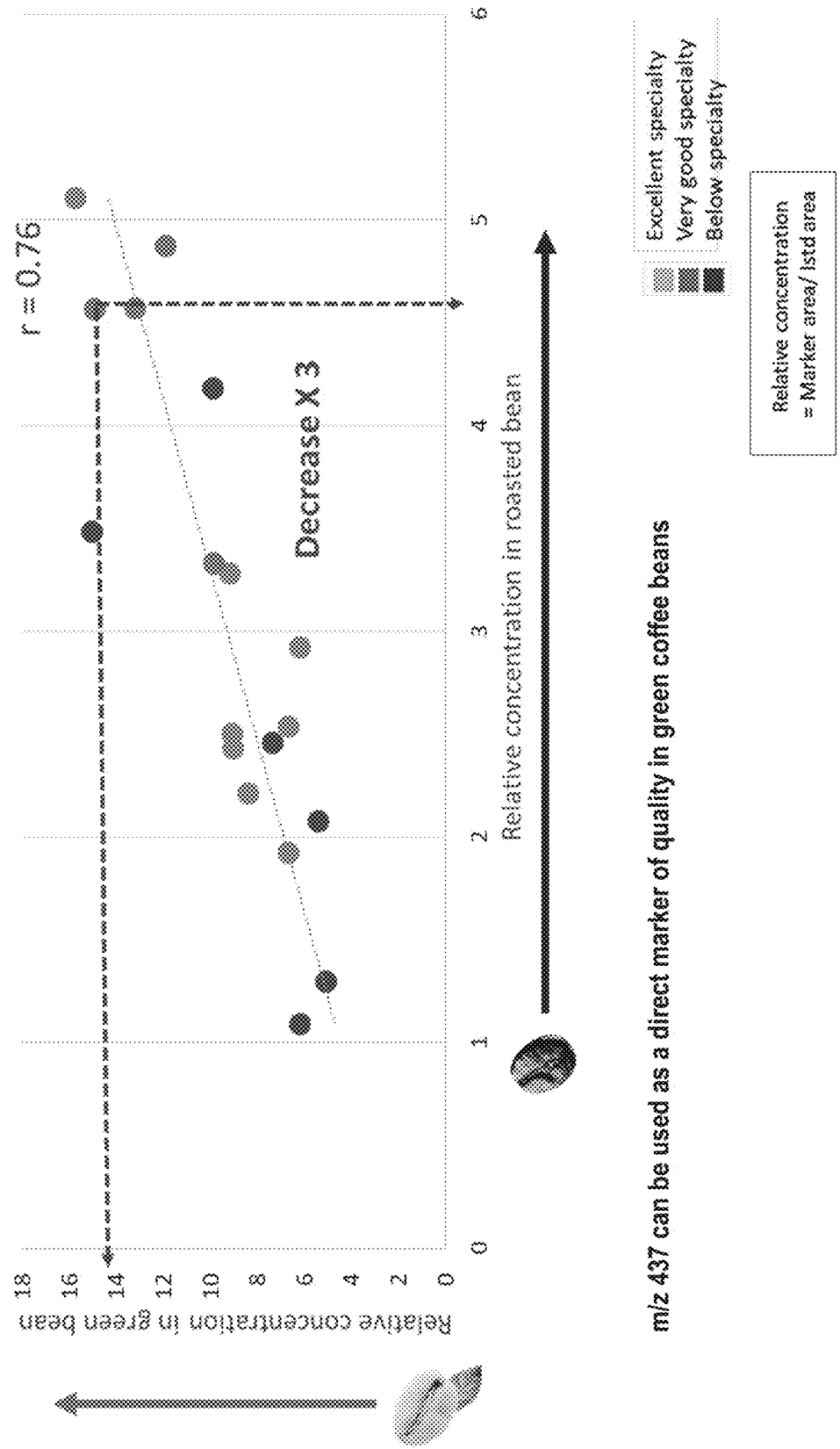
Figure 18:
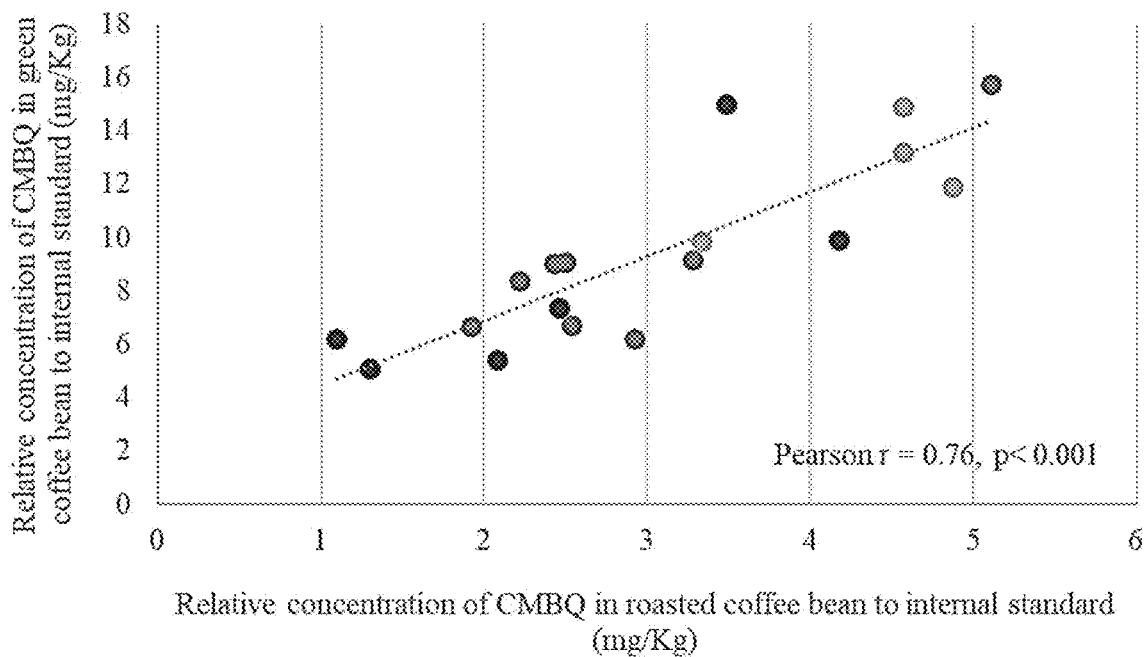
FIG. 18 depicts relative concentration of 3-O-caffeoyl-4-O-3-methylbutanoylquinic acid (CMBQ) in green and roasted coffee beans to internal standard; eclipse highlight samples had noted flavor defects.

The levels of compound 3-O-caffeoyl-4-O-3-methylbutanoylquinic acid in the green bean and corresponding roasted bean for the eighteen coffee samples were plotted and reported a significant positive Pearson correlation (r) of 0.76, p<0.0001 (shown in FIGS. 17 and 18). Review of the data indicated 3-O-caffeoyl-4-O-3-methylbutanoylquinic acid was approximately 2- to 3-fold higher amount in the in the green coffee bean compared to the corresponding roasted bean extract. Interestingly two samples of the below specialty coffees (circled samples, FIG. 18), showed similar levels in the green beans as excellent specialty coffee. Further review of cupper's flavor notes for these two samples revealed that these two samples had flavor defects including old, baggy (coffee jute), paper, vegetal, raw potato flavors, and moldy notes which most likely reduced the cup score, regardless of the concentration of 3-O-caffeoyl-4-O-3-methylbutanoylquinic acid. These two samples were removed from the sample data set and a correlation plot between the levels of 3-O-caffeoyl-4-O-3-methylbutanoylquinic acid in remaining 16 green coffee bean samples was plotted against resultant SCA coffee cup score, reporting a significant Pearson correlation (r)=0.71, p<0.0001. Based on the observed significant linear relationship between levels of 3-O-caffeoyl-4-O-3-methylbutanoylquinic acid in green coffee bean and cup score, this novel compound provided a new molecular marker to access green coffee bean quality.

Figure 3:
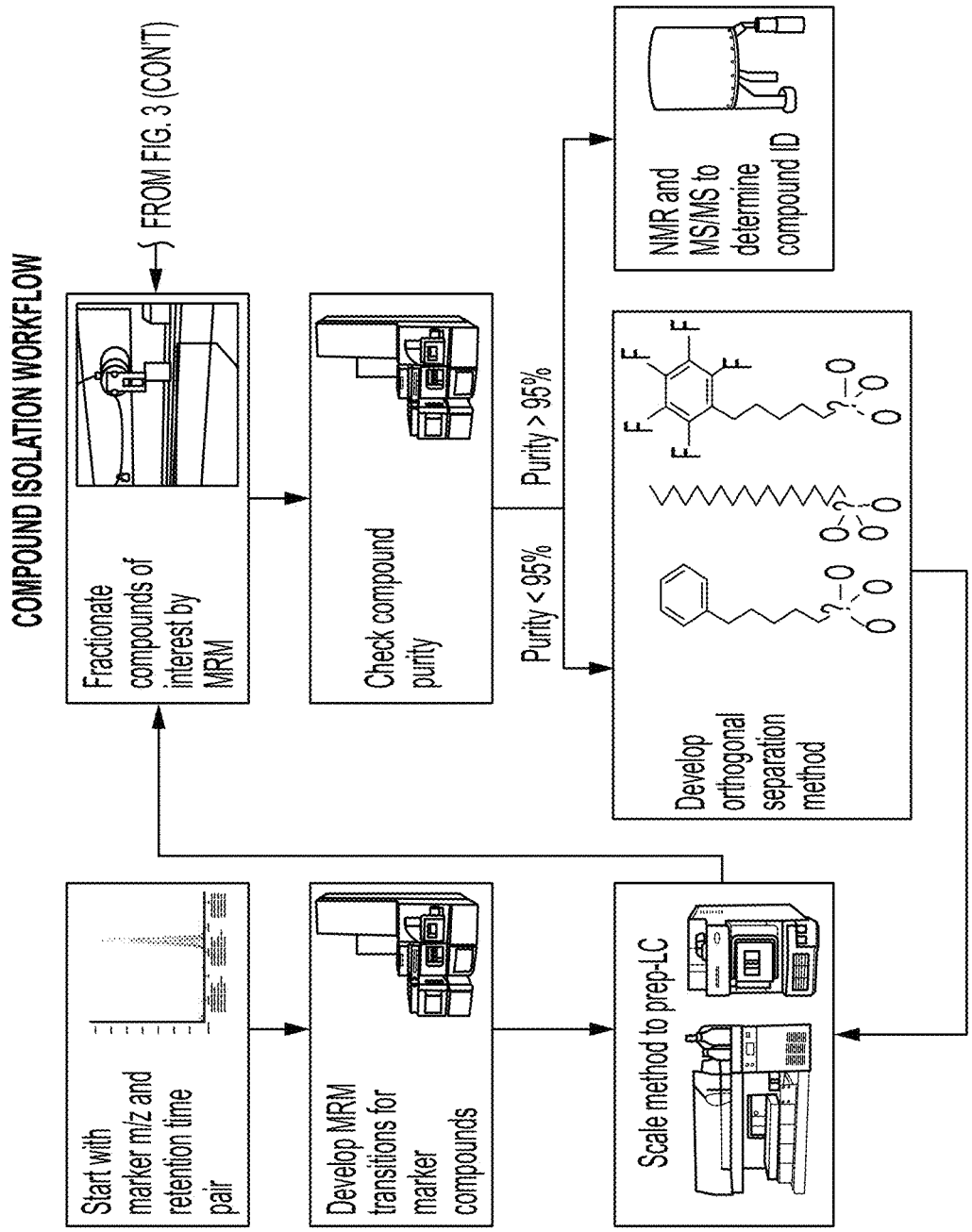
FIG. 3 depicts a schematic for the isolation of flavor enhancing compounds.
Figure 4:
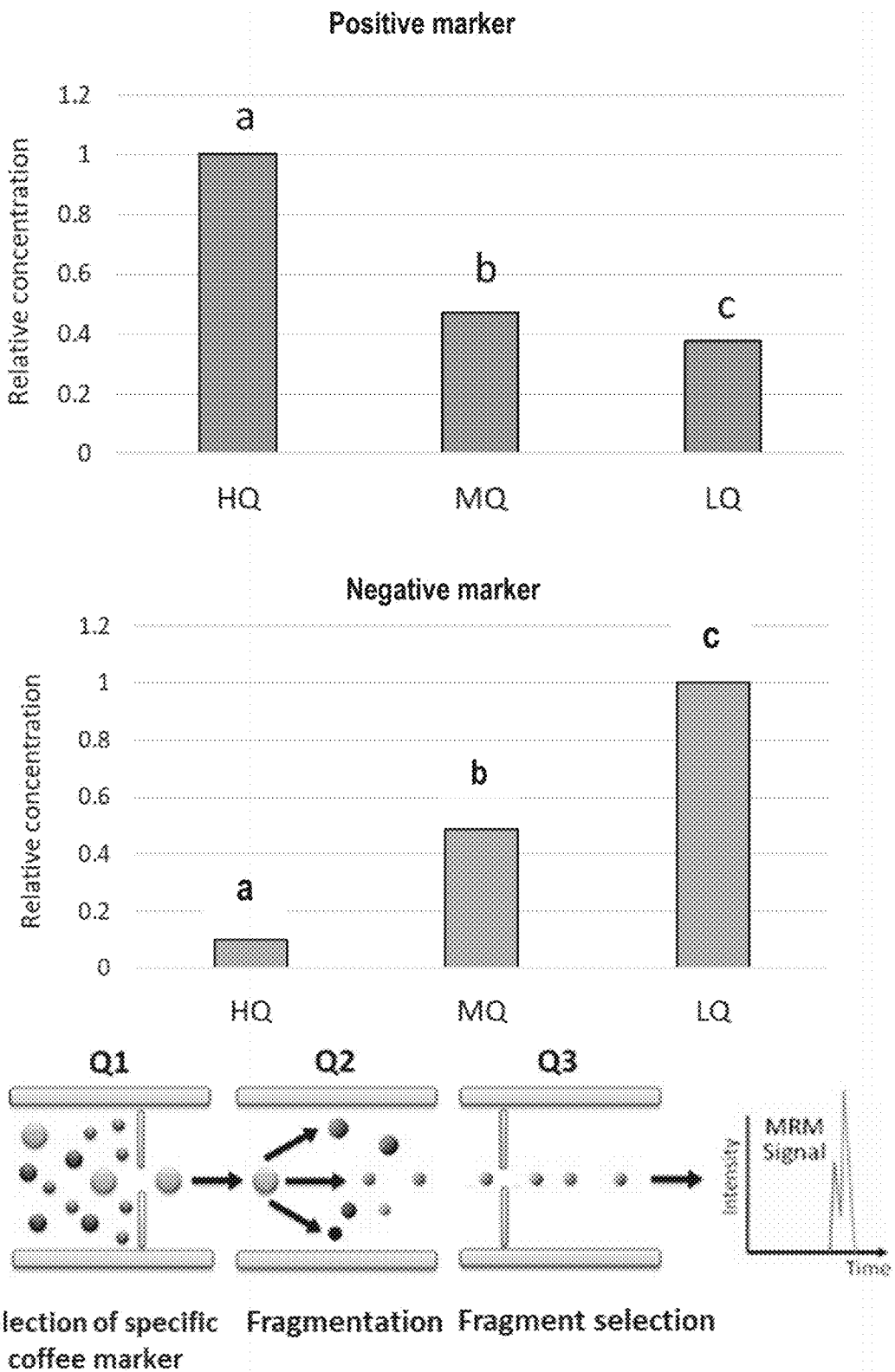
FIG. 4 depicts quantitative profiles for certain flavor enhancing compounds.
Figure 5:
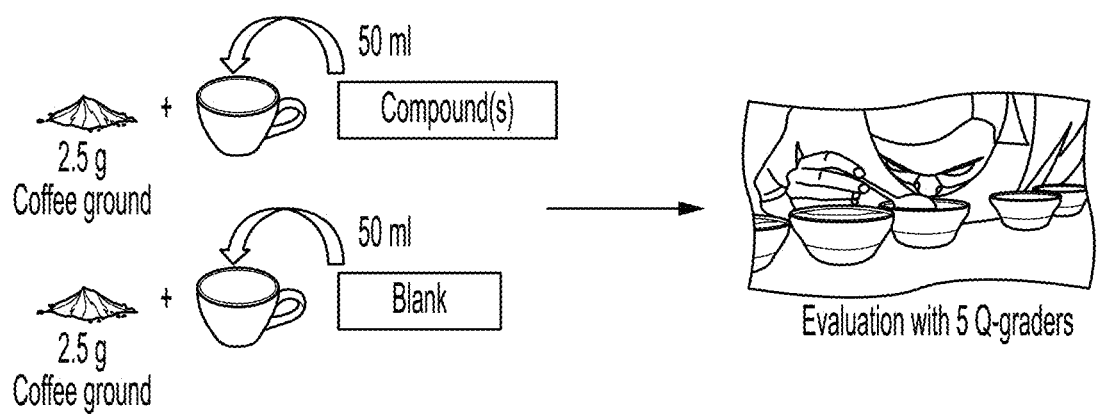
FIG. 5 depicts the combination of initial coffee quality with a flavor enhancing compound to increase overall coffee quality.
Figure 6:
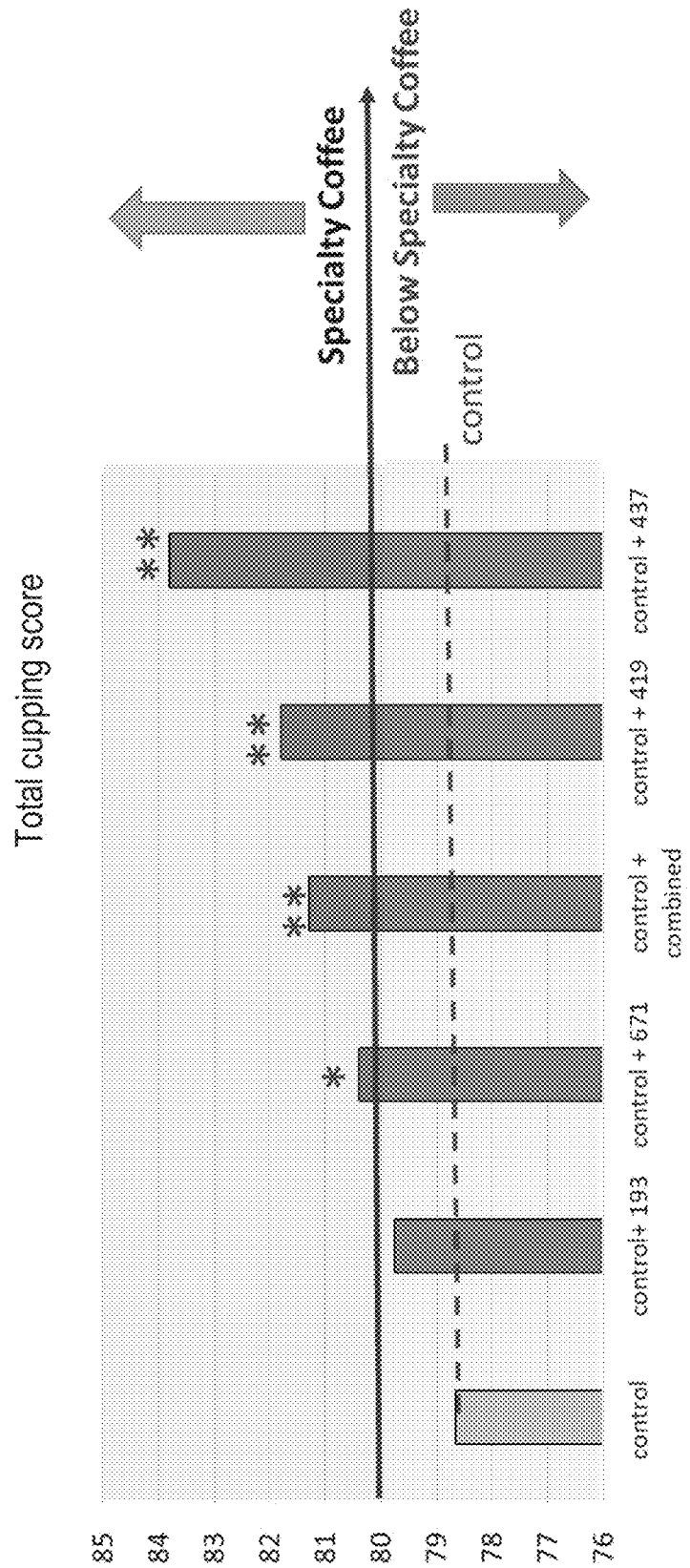
FIG. 6 depicts the sensory impact of positive markers on sensed coffee quality.
Figure 12:
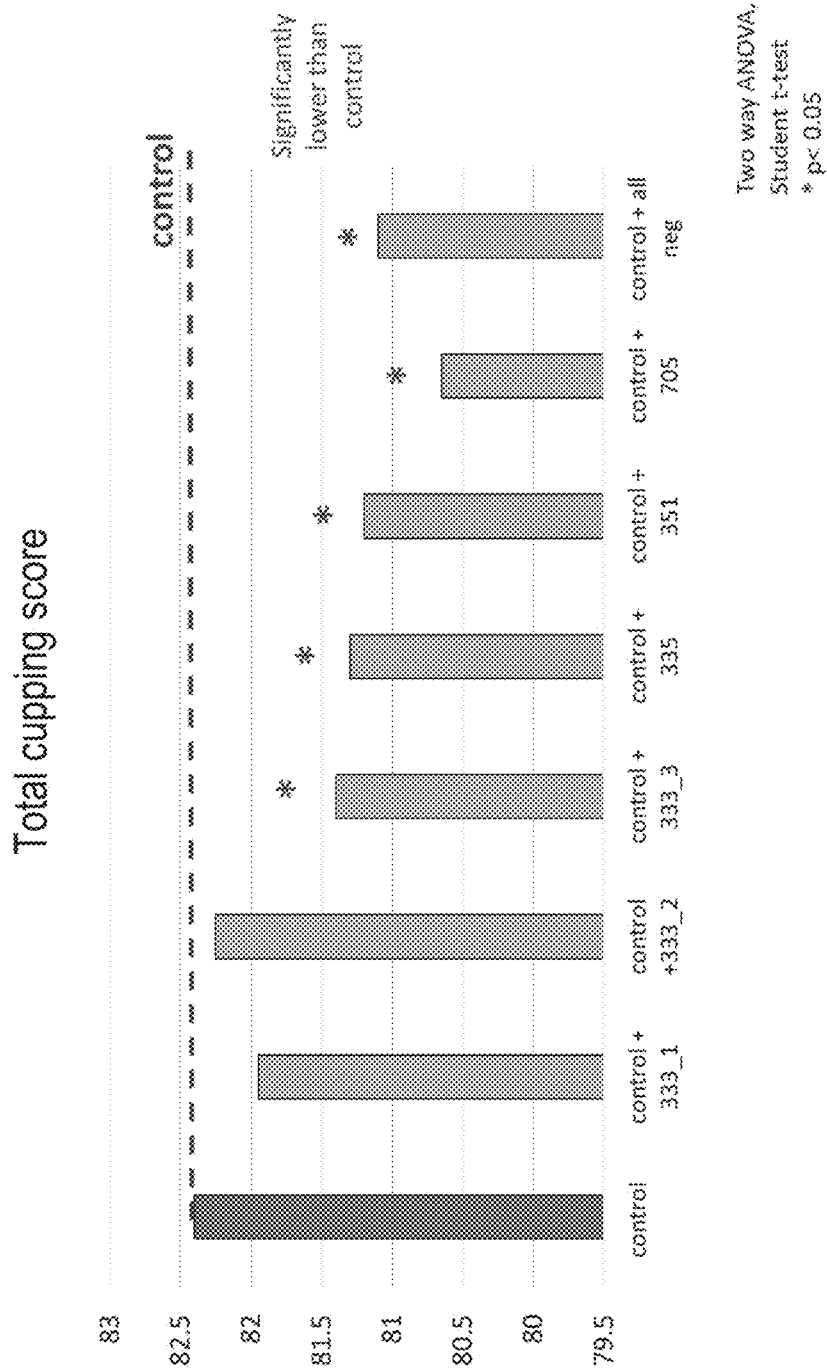
Figure 16:
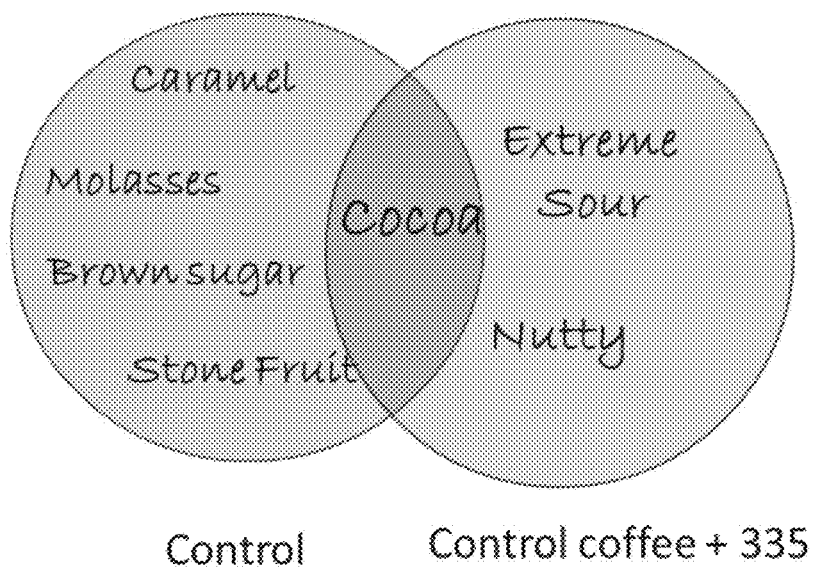
FIGS. 16 and 17 depict the occurrence of certain compounds in green and roasted beans.

Further evaluation compound 3-O-caffeoyl-4-O-3-methylbutanoyl-1,5-quinide, the second most influential compound on cup score (FIG. 19), was only detected in the roasted beans; no detectable amounts were found in the green beans. Based on the compound structure (FIG. 3b) the origin of this compound was deduced to occur through cyclization and further dehydration of the quinic acid hydroxy group and carboxyl group on the quinide moiety of the 3-O-caffeoyl-4-O-3-methylbutanoylquinic acid during roasting. Finally, no significant correlation for the levels of feature 8.25_671 in green beans and roasted beans was observed Andujar-Ortiz, I., Peppard, T. L., & Reineccius, G. (2015). Flavoromics for determining markers of cooked and fermented flavor in strawberry juices. In *ACS Symposium Series* (Vol. 1191, pp. 293-312).

Bertrand, B., Boulanger, R., Dussert, S., Ribeyre, F., Berthiot, L., Descroix, F., & Joet, T. (2012). Climatic factors directly impact the volatile organic compound fingerprint in green *Arabica* coffee bean as well as coffee beverage quality. *Food Chemistry*, 135(4), 2575-2583.

Blank, I., Sen, A., & Grosch, W. (1991). Aroma impact compounds of *arabica* and *robusta* coffee. Qualitative and quantitative investigations. *ASIC.* 14e Colloque, 117-129.

Blank, I., Sen, A., & Grosch, W. (1992). Potent odorants of the roasted powder and brew of *Arabica* coffee. *Zeitschrift Für Lebensmittel-Untersuchung UndForschung*, 195(3), 239-245.

Bucheli, P., Meyer, I., Pittet, A., Vuataz, G., & Viani, R. (1998). Industrial storage of green *Robusta* coffee under tropical conditions and its impact on raw material quality and ochratoxin A content. *Journal of Agricultural and Food Chemistry*, 46(11), 4507-4511.

Buffo, R. A., & Cardelli-Freire, C. (2004). Coffee flavour: an overview. *Flavour and Fragrance Journal*, 19(2), 99-104.

Charles, M., Romano, A., Yener, S., Barnaba, M., Navarini, L., Mark, T. D., . . . Gasperi, F. (2015). Understanding flavour perception of espresso coffee by the combination of a dynamic sensory method and in-vivo nosespace analysis. *Food Research International*, 69, 9-20.

Charve, J., Chen, C., Hegeman, A. D., & Reineccius, G. A. (2011). Evaluation of instrumental methods for the untargeted analysis of chemical stimuli of orange juice flavour. *Flavour andFragrance Journal*, 26(6), 429-440.

Chung, H. Y., Fung, P. K., & Kim, J. S. (2005). Aroma impact components in commercial plain sufu. *Journal of Agricultural and Food Chemistry*, 53(5), 1684-1691.

Clifford, M. N. (1985). Chemical and Physical Aspects of Green Coffee and Coffee Products. In Coffee (pp. 305-374). Boston, MA: Springer US.

Clifford, M. N., Johnston, K. L., Knight, S., & Kuhnert, N. (2003). Hierarchical scheme for LC-MSnidentification of chlorogenic acids. *Journal of Agricultural and Food Chemistry*, 51(10), 2900-2911.

Craig, A. P., Botelho, B. G., Oliveira, L. S., & Franca, A. S. (2018). Mid infrared spectroscopy and chemometrics as tools for the classification of roasted coffees by cup quality. *Food Chemistry*, 245, 1052-1061.

Dalton, P., Doolittle, N., Nagata, H., & Breslin, P. A. S. (2000). The merging of the senses: integration of subthreshold taste and smell. *Nature Neuroscience*, 3(5), 431-432.

Dorfner, R., Ferge, T., Kettrup, A., Zimmermann, R., & Yeretzian, C. (2003). Real-time monitoring of 4-vinylguaiacol, guaiacol, and phenol during coffee roasting by resonant laser ionization time-of-flight mass spectrometry. *Journal of Agricultural and Food Chemistry*, 51(19), 5768-5773.

Farah, A., De Paulis, T., Trugo, L. C., & Martin, P. R. (2005). Effect of roasting on the formation of chlorogenic acid lactones in coffee. *Journal of Agricultural and Food Chemistry*, 53(5), 1505-1513.

Feng, Y., Cui, C., Zhao, H., Gao, X., Zhao, M., & Sun, W. (2013). Effect of koji fermentation on generation of volatile compounds in soy sauce production. *International Journal of Food Science and Technology*, 48(3), 609-619.

Feria-Morales, A. M. (2002). Examining the case of green coffee to illustrate the limitations of grading systems/expert tasters in sensory evaluation for quality control. *Food Quality and Preference*, 13(6), 355-367.

Frank, O., Zehentbauer, G., Hofmann, T., Frank, O., Hofmann, T., & Zehentbauer, G. (2006). Bioresponse-guided decomposition of roast coffee beverage and identification of key bitter taste compounds. *Eur Food Res Technol*, 222, 492-508.

Galindo-Prieto, B., Eriksson, L., & Trygg, J. (2014). Variable influence on projection (VIP) for orthogonal projections to latent structures (OPLS). *Journal of Chemometrics*, 28(8), 623-632.

Giacalone, D., Fosgaard, T. R., Steen, I., & Munchow, M. (2016). "Quality does not sell itself." *British Food Journal*, 118(10), 2462-2474.

Holscher, W., Vitzthum, O. G., & Steinhart, H. (1990). Identification and sensorial evaluation of aroma-impact-compounds in roasted colombian coffee. *Caf, Cacao Th.*, 34(3), 205-212.

Iwasa, K., Setoyama, D., Shimizu, H., Seta, H., Fujimura, Y., Miura, D., . . . Nakahara, K. (2015). Identification of 3-Methylbutanoyl Glycosides in Green *Coffea arabica* Beans as Causative Determinants for the Quality of Coffee Flavors. *Journal of Agricultural and Food Chemistry*, 63(14), 3742-3751.

Jelen, H. (2012). *Food flavors: chemical, sensory and technological properties*. CRC Press. Kumazawa, K., & Masuda, H. (2003). Investigation of the change in the flavor of a coffee drink during heat processing. *Journal of Agricultural and Food Chemistry*, 51(9), 2674-2678.

Kurtz, Robert J., Fuller, W. D. (1990). U.S. Pat. No. 5,232,735.
Kwon, D.-J., Jeong, H.-J., Moon, H., Kim, H.-N., Cho, J.-H., Lee, J.-E., . . . Hong, Y.-S. (2015). Assessment of green coffee bean metabolites dependent on coffee quality using a 1H NMR-based metabolomics approach. *Food Research International,* 67, 175-182.
Ley, J. P. (2008). Masking bitter taste by Molecules. *Chemosensory Perception,* 1(1), 58-77.
Ley, J. P., Blings, M., Paetz, S., Krammer, G. E., & Bertram, H. J. (2006). New bitter-masking compounds: Hydroxylated benzoic acid amides of aromatic amines as structural analogues of homoeriodictyol. *Journal of Agricultural and Food Chemistry,* 54(22), 8574-8579.
Minjien, Chieng, Alex, Hausler, Han, V. (2002). U.S. Pat. No. 8,197,875.
Pereira, L. L., Cardoso, W. S., Guargoni, R. C., da Fonseca, A. F. A., Moreira, T. R., & Caten, C. S. ten. (2017). The consistency in the sensory analysis of coffees using Q-graders. *European Food Research and Technology,* 243(9), 1545-1554.
Piccino, S., Boulanger, R., Descroix, F., & Shum Cheong Sing, A. (2014). Aromatic composition and potent odorants of the "specialty coffee" brew "Bourbon Pointu" correlated to its three trade classifications. *Food Research International,* 61, 264-271.
Ribeiro, J. S., Ferreira, M. M. C., & Salva, T. J. G. (2011). Chemometric models for the quantitative descriptive sensory analysis of *Arabica* coffee beverages using near infrared spectroscopy. *Talanta,* 83(5), Charles-Bernard M, Kraehenbuehl K, Rytz A, Roberts.
Riemer, J. A. (1993). U.S. Pat. No. 5,336,513.
Ronningen, I., Miller, M., Xia, Y., & Peterson, D. G. (2018). Identification and Validation of Sensory-Active Compounds from Data-Driven Research: A Flavoromics Approach. *Journal of Agricultural and Food Chemistry,* 66(10), 2473-2479.
Ronningen, I., & Peterson, D. G. (2018). Identification of Aging-Associated Food Quality Changes in Citrus Products Using Untargeted Chemical Profiling. *Journal of Agricultural and Food Chemistry,* 66(3), 682-688.
Samoggia, A., & Riedel, B. (2018, October 1). Coffee consumption and purchasing behavior review: Insights for further research. *Appetite.* Academic Press.
SCA. (2018). Protocols & Best Practices-Specialty Coffee Association. Retrieved from https://sca.coffee/research/protocols-best-practices/Schieberle, P., & Grosch, W. (1988). Quantitative analysis of important volatile flavour compounds in fresh and stored lemon oil/citric acid emulsions. Lebensm.-Wiss.u.-Technol., 21, 158-162.
Schrader, K., Kiehne, A., Engelhardt, U. H., & Maier, H. G. (1996). Determination of chlorogenic acids with lactones in roasted coffee. *J Sci Food Agric,* 71(3), 392-398.
Sunarharum, W. B., Williams, D. J., & Smyth, H. E. (2014). Complexity of coffee flavor: A compositional and sensory perspective. *Food Research International,* 62, 315-325.
Swillam, M. A., & Helmy, A. S. (2011). Characteristics and applications of rectangular waveguide in sensing, slow light and negative refraction. In *Proceedings of SPIE—The International Society for Optical Engineering* (Vol. 7941, pp. 2880-2884).
Teegarden, M. D., Schwartz, S. J., & Cooperstone, J. L. (2019). Profiling the impact of thermal processing on black raspberry phytochemicals using untargeted metabolomics. *Food Chemistry,* 274, 782-788.
Toci, A. T., & Farah, A. (2008). Volatile compounds as potential defective coffee beans' markers. *Food Chemistry,* 108(3), 1133-1141.
Tolessa, K., Rademaker, M., De Baets, B., & Boeckx, P. (2016). Prediction of specialty coffee cup quality based on near infrared spectra of green coffee beans. *Talanta,* 150, 367-374.
Upadhyay, R., & Mohan Rao, L. J. (2013). An Outlook on Chlorogenic Acids-Occurrence, Chemistry, Technology, and Biological Activities. *Critical Reviews in Food Science and Nutrition,* 53(9), 968-984.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:
1. A method of improving coffee, comprising adding one or more flavor enhancing compounds to the coffee, wherein the flavor enhancing compound has the formula:

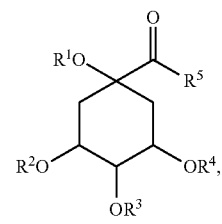

wherein $R^3$ is a caffeic acid derivative having the formula:

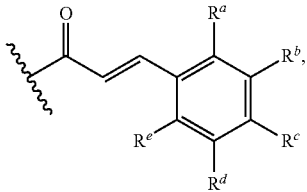

wherein $R^a$, $R^b$, $R^c$, $R^d$, and $R^e$ are independently selected from R and OR, wherein R is in each case independently selected from hydrogen and $C_{1-8}$alkyl;

$R^4$ is H and $R^5$ is OH, or $R^4$ and $R^5$ together form a bond; and $R^1$ and $R^2$ are independently selected from hydrogen and C(O)R, wherein R is $C_{1-8}$alkyl.

2. The method of claim 1, wherein the flavor enhancing compound has the formula:

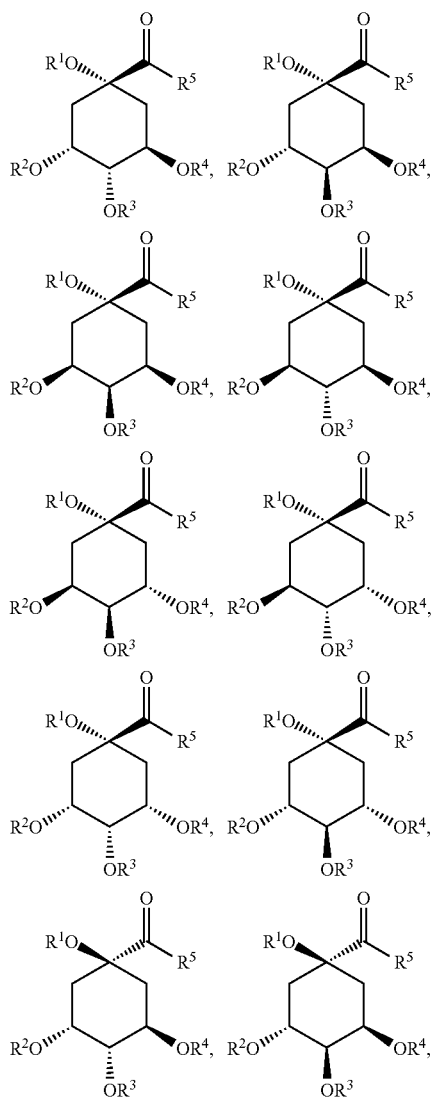

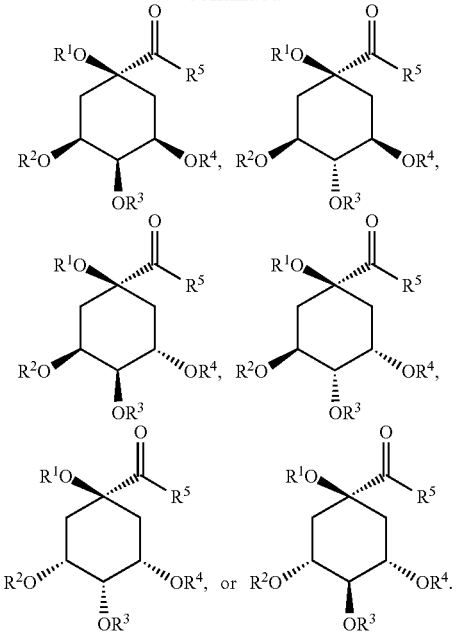

3. The method of claim 1, wherein $R^2$ is C(O)—$C_{1-8}$alkyl group.

4. The method of claim 1, wherein the flavor enhancing compound is added in an amount of at least 5 mg/kg.

5. The method of claim 1, wherein the flavor enhancing compound is added to coffee beans prior to fermentation, to coffee beans during fermentation, to coffee beans prior to roasting, to coffee beans during roasting, to coffee beans subsequent to roasting, to coffee beans prior to grinding, to coffee beans during grinding, to coffee grinds prior to brewing, to coffee grinds during brewing, to a brewed coffee beverage, to a dehydrated coffee beverage, or a combination thereof.

6. A coffee composition produced by the method of claim 1.

7. A method of improving coffee, comprising adding one or more flavor enhancing compounds to the coffee, wherein the flavor enhancing compound has the formula:

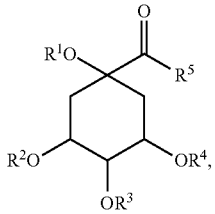

wherein $R^1$ is H;
$R^2$ is a caffeic acid derivative having the formula:

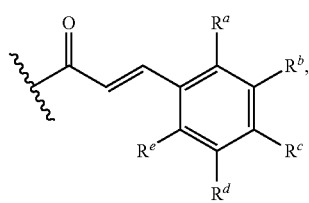

wherein $R^a$, $R^b$, $R^c$, $R^d$, and $R^e$ are independently selected from H, OH, and $OC_{1-8}$alkyl;

$R^3$ is selected from H and C(O)R wherein R is $C_{1-8}$alkyl;

$R^4$ is H or C(O)R wherein R is $C_{1-8}$alkyl and $R^5$ is OH, or $R^4$ and $R^5$ together form a bond;

wherein at least one of $R^3$ and $R^4$ are C(O)R.

8. The method of claim 7, wherein the flavor enhancing compound has the formula:

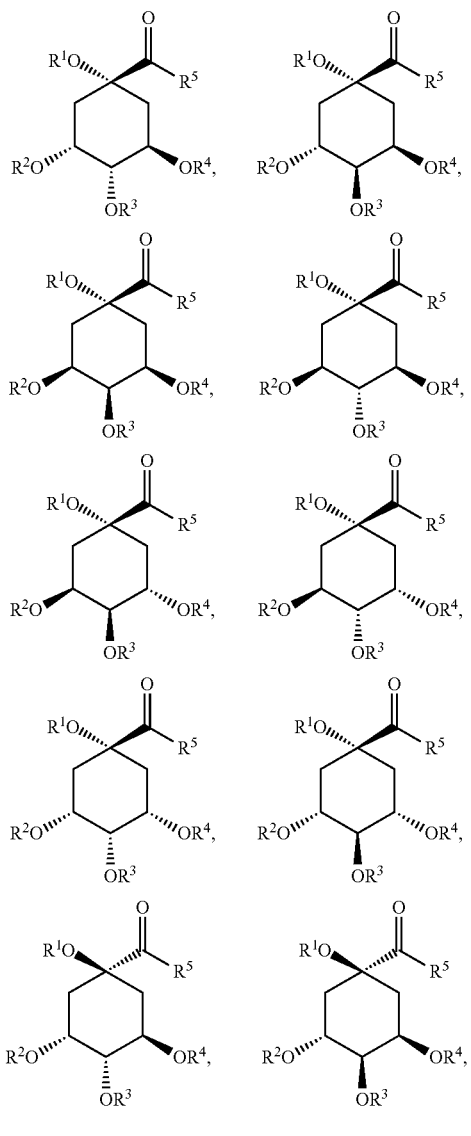

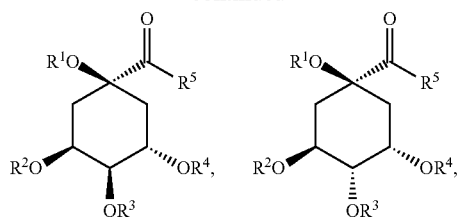

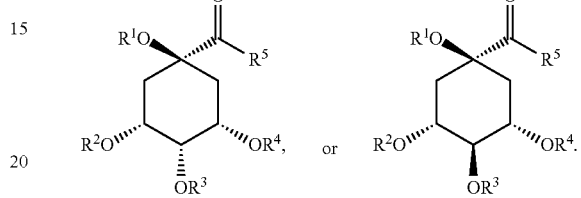

9. The method of claim 7, wherein the flavor enhancing compound is added in an amount of at least 5 mg/kg.

10. The method of claim 7, wherein the flavor enhancing compound is added to coffee beans prior to fermentation, to coffee beans during fermentation, to coffee beans prior to roasting, to coffee beans during roasting, to coffee beans subsequent to roasting, to coffee beans prior to grinding, to coffee beans during grinding, to coffee grinds prior to brewing, to coffee grinds during brewing, to a brewed coffee beverage, to a dehydrated coffee beverage, or a combination thereof.

11. A coffee composition produced by the method of claim 7.

12. The method of claim 7, wherein $R^4$ is H and $R^3$ is C(O)R, wherein R is selected from methyl, ethyl, n-propyl, isopropyl, n-butyl, isobutyl, sec-butyl, and t-butyl.

13. The method of claim 7, wherein $R^4$ and $R^5$ together form a bond and $R^3$ is C(O)R, wherein R is selected from methyl, ethyl, n-propyl, isopropyl, n-butyl, isobutyl, sec-butyl, and t-butyl.

14. The method of claim 7, wherein $R^3$ is H and $R^4$ is C(O)R, wherein R is selected from methyl, ethyl, n-propyl, isopropyl, n-butyl, isobutyl, sec-butyl, and t-butyl.

15. The method of claim 7, wherein $R^3$ is H and $R^4$ is C(O)R, wherein R is isobutyl.

16. A method of improving coffee, comprising adding one or more flavor enhancing compounds to the coffee, wherein the flavor enhancing compound has the formula:

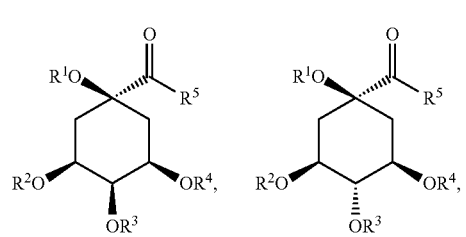

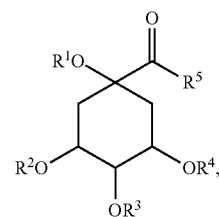

$R^2$ is a caffeic acid derivative having the formula:

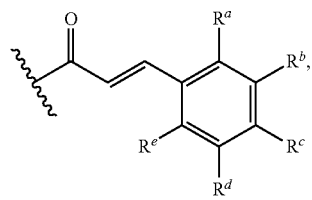

wherein $R^a$, $R^b$, $R^c$, $R^d$, and $R^e$ are independently selected from H, OH, and $OC_{1-8}$alkyl;
$R^1$ is C(O)R wherein R is $C_{1-8}$alkyl;
$R^3$ is selected from H and C(O)R wherein R is $C_{1-8}$alkyl;
$R^4$ is H or C(O)R wherein R is $C_{1-8}$alkyl and $R^5$ is OH, or $R^4$ and $R^5$ together form a bond.

17. The method of claim 16, wherein the flavor enhancing compound has the formula:

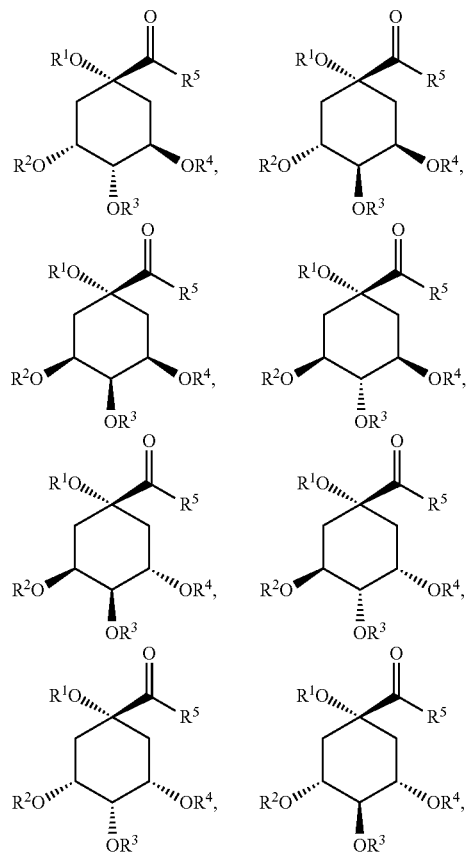

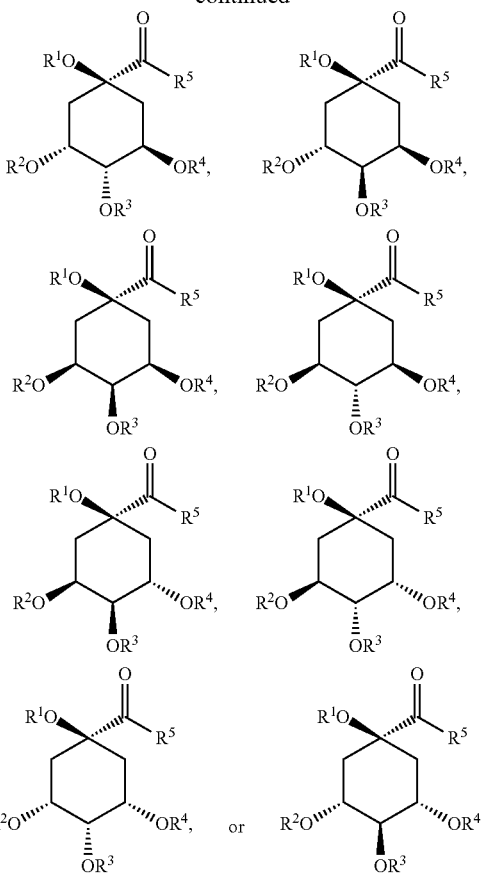

18. The method of claim 16, wherein the flavor enhancing compound is added in an amount of at least 5 mg/kg.

19. The method of claim 16, wherein the flavor enhancing compound is added to coffee beans prior to fermentation, to coffee beans during fermentation, to coffee beans prior to roasting, to coffee beans during roasting, to coffee beans subsequent to roasting, to coffee beans prior to grinding, to coffee beans during grinding, to coffee grinds prior to brewing, to coffee grinds during brewing, to a brewed coffee beverage, to a dehydrated coffee beverage, or a combination thereof.

20. A coffee composition produced by the method of claim 16.

* * * * *